United States Patent
White

(10) Patent No.: US 12,171,149 B2
(45) Date of Patent: Dec. 24, 2024

(54) FOLDABLE SHOVEL

(71) Applicant: Christopher White, Kings Beach, CA (US)

(72) Inventor: Christopher White, Kings Beach, CA (US)

( * ) Notice: Subject to any disclaimer, the term of this patent is extended or adjusted under 35 U.S.C. 154(b) by 354 days.

(21) Appl. No.: 17/324,578

(22) Filed: May 19, 2021

(65) Prior Publication Data

US 2022/0369529 A1     Nov. 24, 2022

(51) Int. Cl.
| | |
|---|---|
| *A01B 1/02* | (2006.01) |
| *A01B 1/22* | (2006.01) |
| *A45F 3/14* | (2006.01) |
| *E01H 5/02* | (2006.01) |
| *A45F 3/00* | (2006.01) |

(52) U.S. Cl.
CPC .............. *A01B 1/022* (2013.01); *A01B 1/22* (2013.01); *A45F 3/14* (2013.01); *A45F 2003/003* (2013.01); *A45F 2003/142* (2013.01); *E01H 5/02* (2013.01)

(58) Field of Classification Search
CPC .............. A01B 1/022; A01B 1/22; E01H 5/02
USPC .................................................. 294/54.5, 214
See application file for complete search history.

(56) References Cited

U.S. PATENT DOCUMENTS

| | | | | |
|---|---|---|---|---|
| 1,372,722 | A * | 3/1921 | Paradis ..................... | E01H 5/02 |
| | | | | 294/54.5 |
| 4,607,872 | A * | 8/1986 | Herner ..................... | E01H 5/02 |
| | | | | 37/285 |
| 4,760,982 | A * | 8/1988 | Cooke ................ | B65B 67/1238 |
| | | | | 141/390 |
| 5,205,107 | A * | 4/1993 | Herink ................... | B65B 39/08 |
| | | | | 141/390 |
| 5,676,412 | A | 10/1997 | Kahley | |
| 5,951,078 | A | 9/1999 | Whitehead | |
| 6,113,168 | A | 9/2000 | Jeor | |
| 6,202,718 | B1 * | 3/2001 | Innocenti ................. | B65F 1/00 |
| | | | | 141/391 |
| 7,367,600 | B1 * | 5/2008 | Lew ......................... | B65F 1/10 |
| | | | | 294/152 |
| 7,730,581 | B2 | 6/2010 | Mirick | |
| 9,255,369 | B2 | 2/2016 | Spataro | |
| 9,359,733 | B2 | 6/2016 | Gehman | |
| 9,695,621 | B2 | 7/2017 | Walhorn | |
| 2011/0247245 | A1 * | 10/2011 | Lam ......................... | E01H 5/02 |
| | | | | 280/18 |
| 2019/0390422 | A1 * | 12/2019 | Tavolino ................ | E01H 5/061 |

* cited by examiner

*Primary Examiner* — Dean J Kramer
(74) *Attorney, Agent, or Firm* — Patrick Reilly

(57) ABSTRACT

A device is provided that includes a shovel blade and one or more handle elements, wherein the shovel blade may fold together with the one or more handle elements for portability such that the person carrying the portable shovel on their back is shielded from the handle elements of the shovel poking or injuring them if they should fall down while carrying the portable shovel.

18 Claims, 33 Drawing Sheets

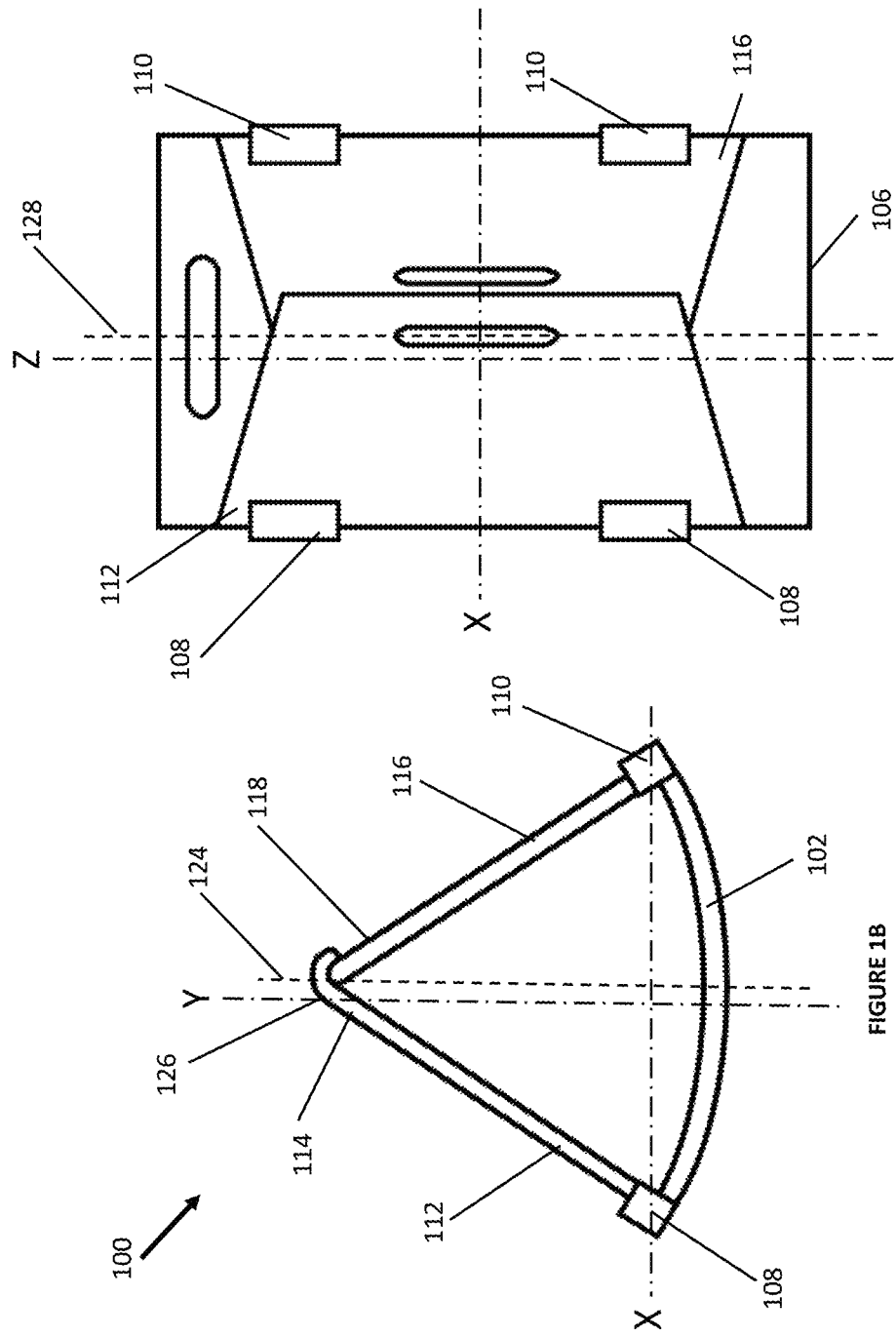

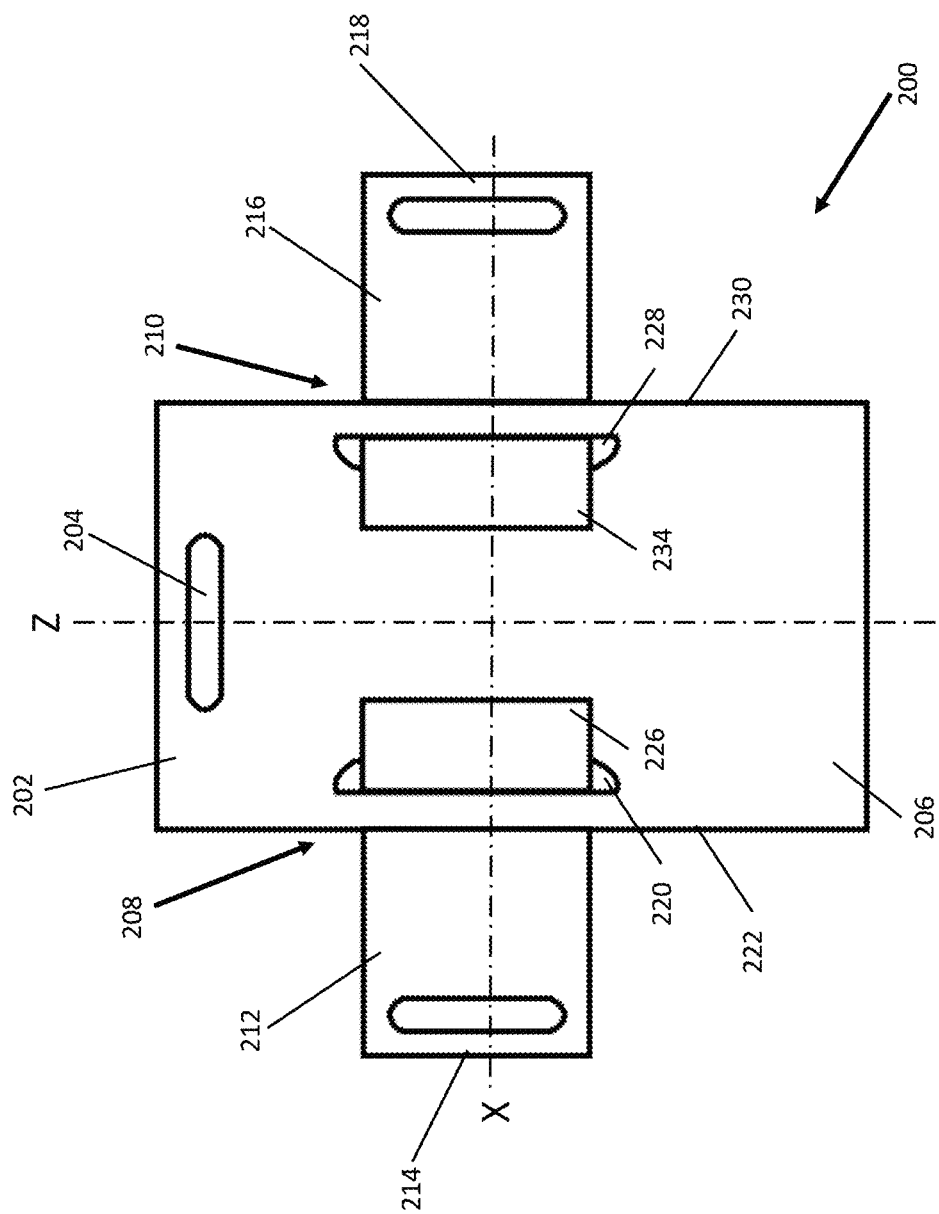

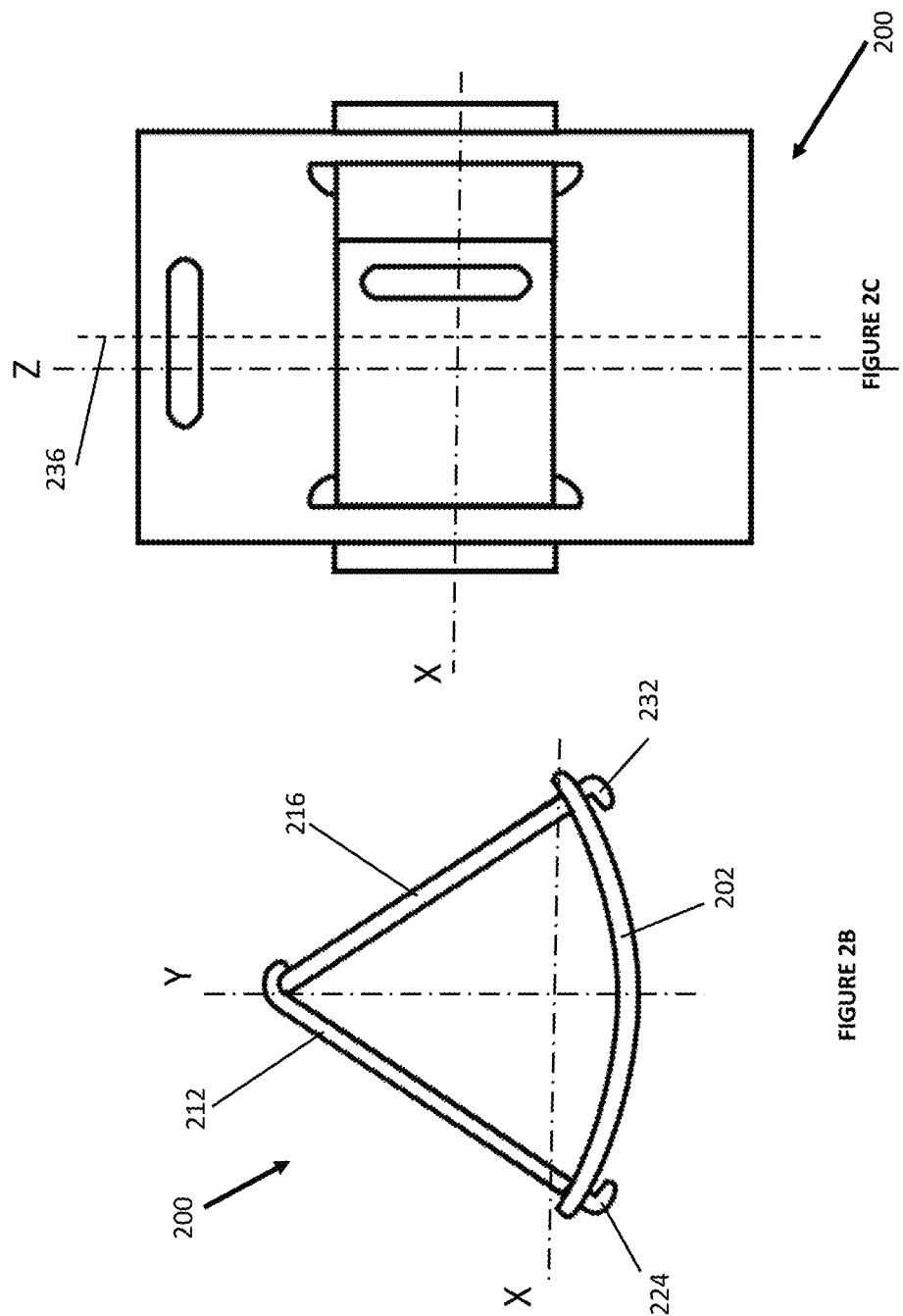

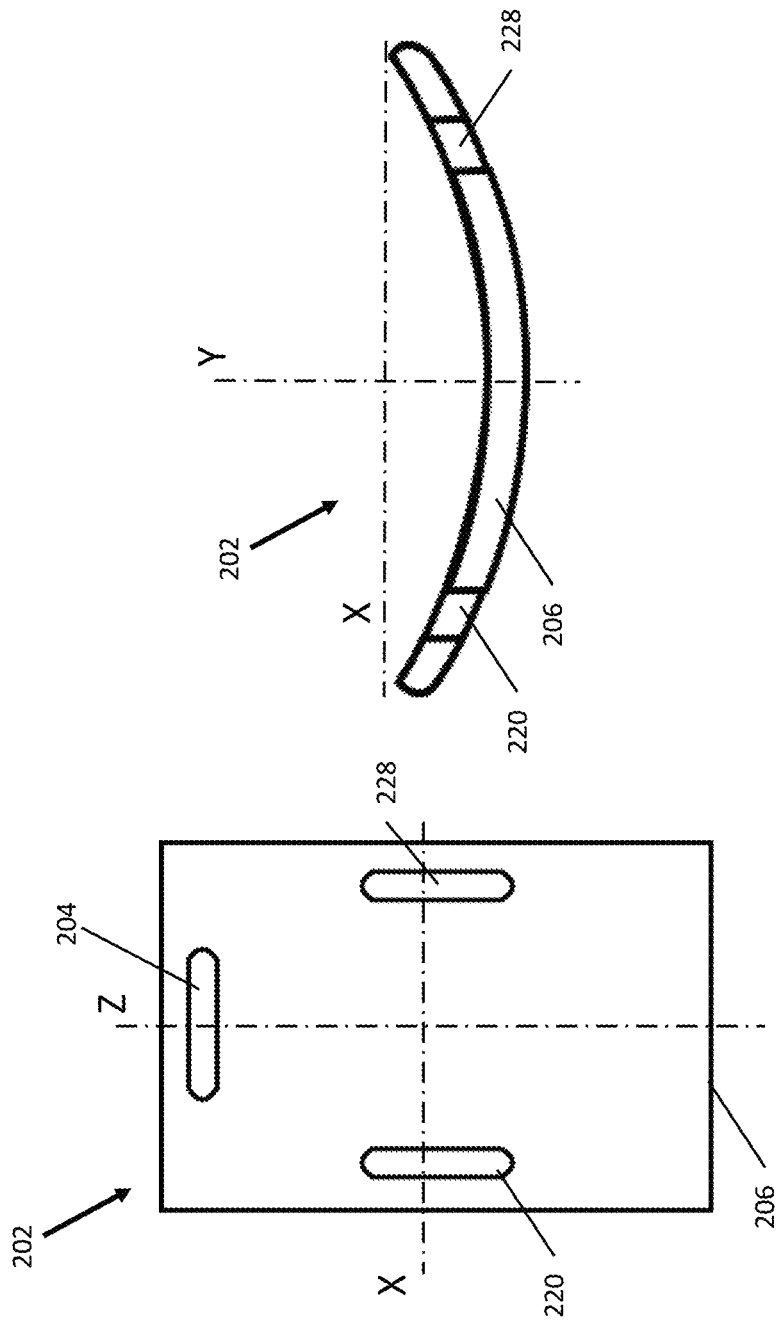

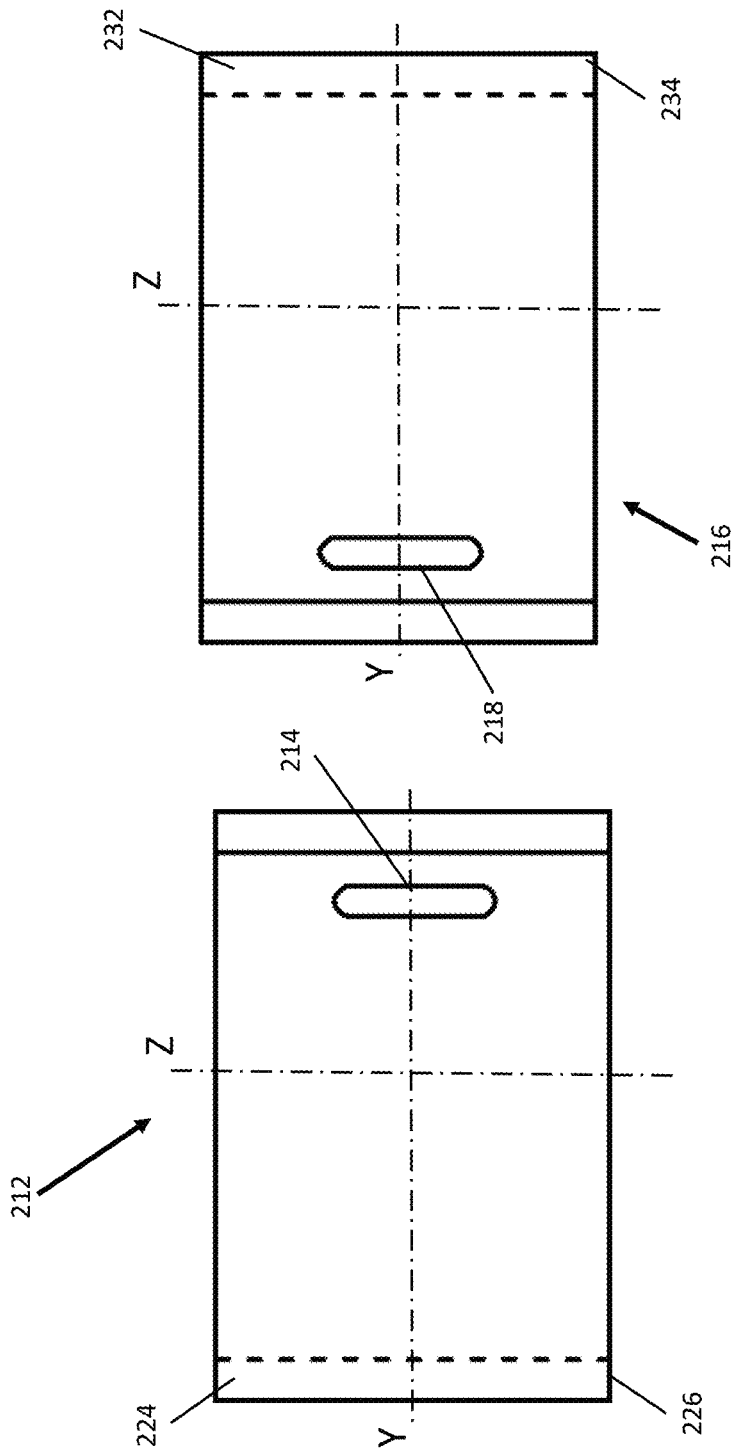

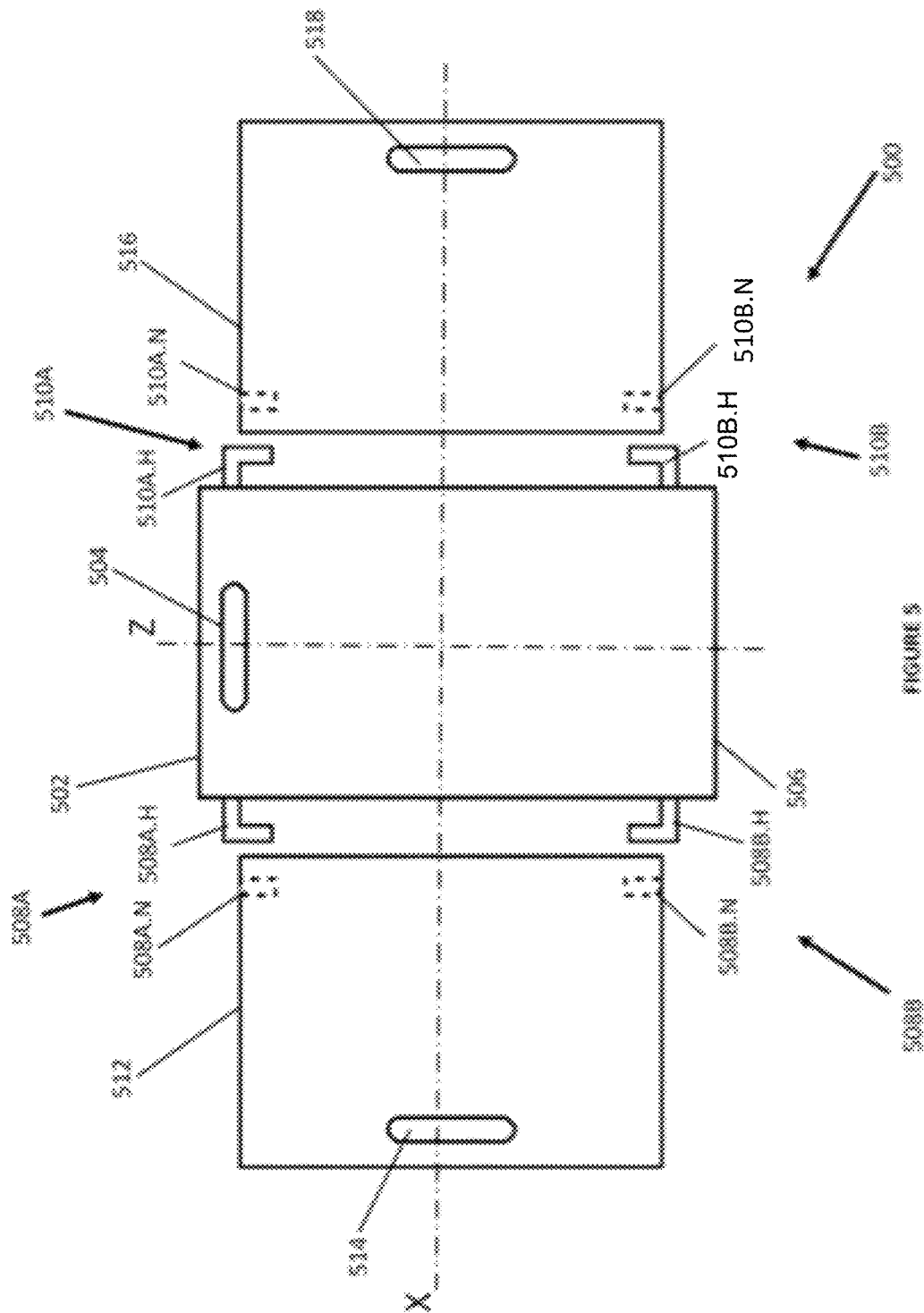

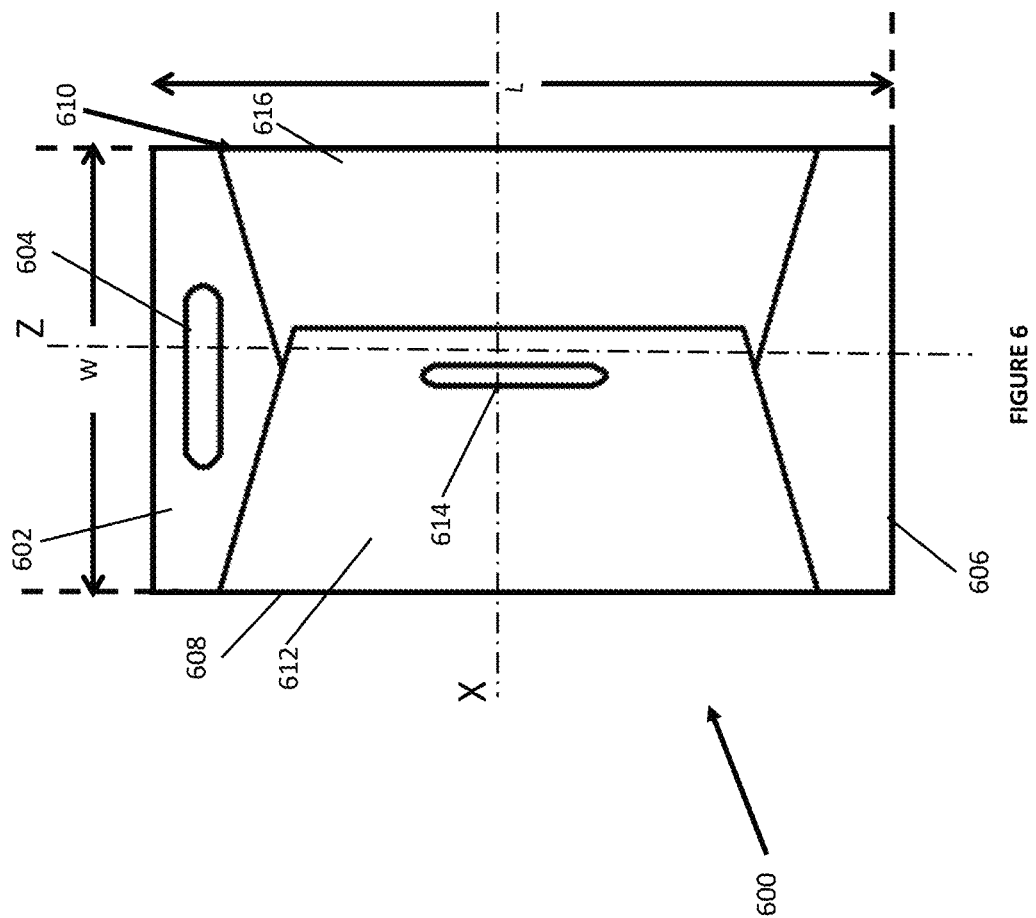

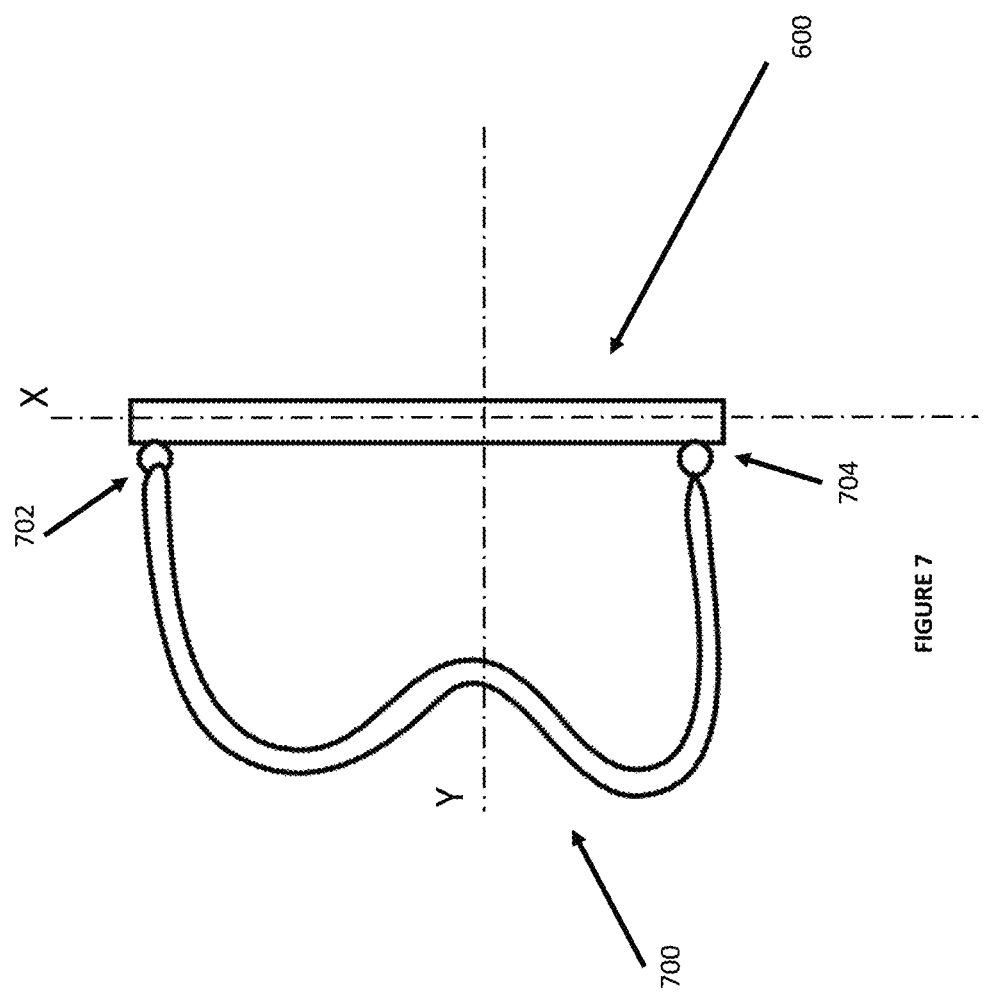

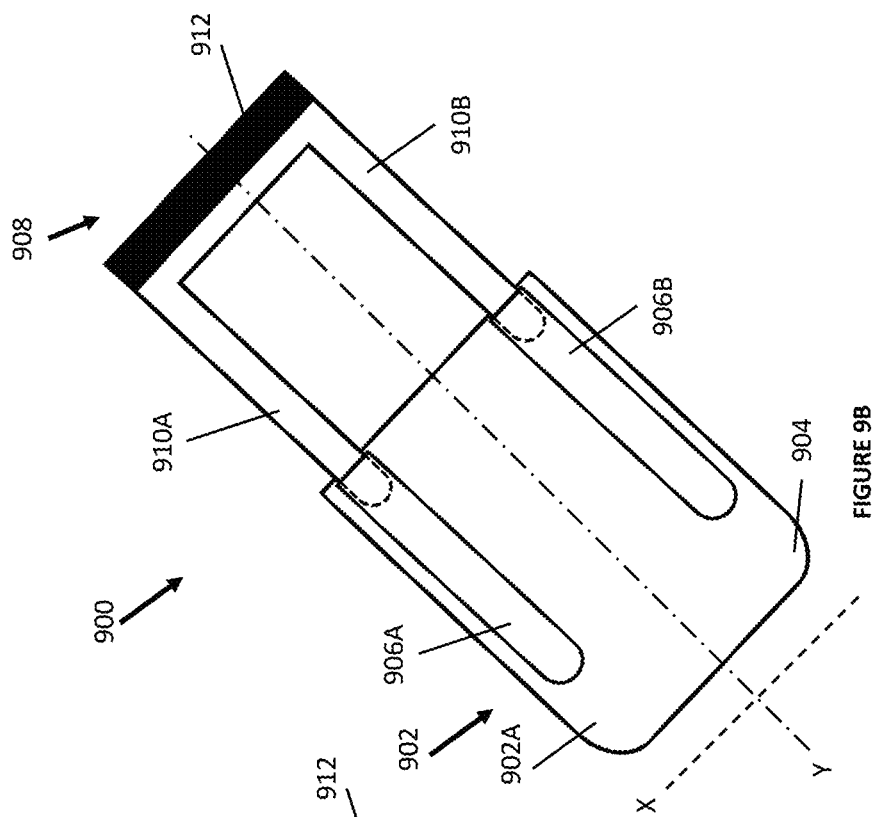
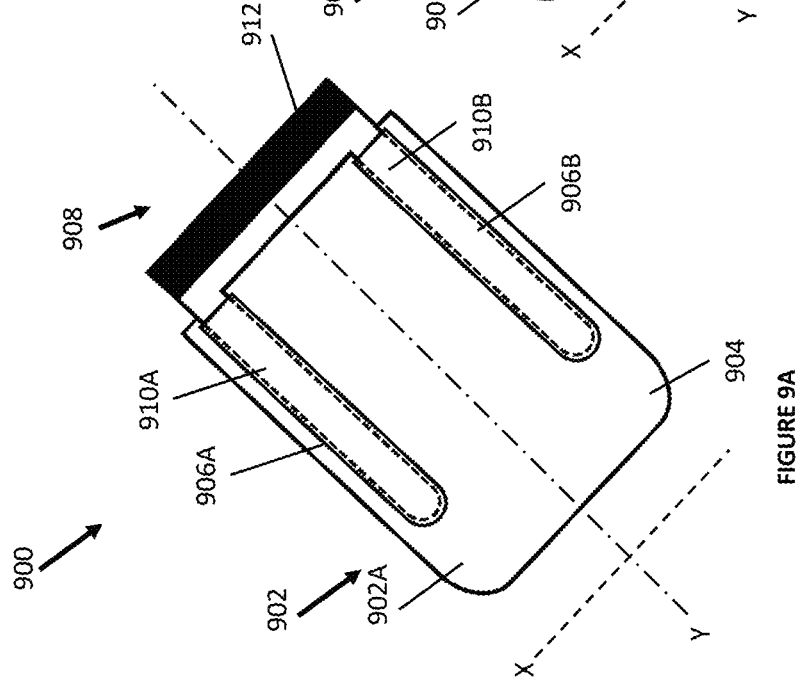

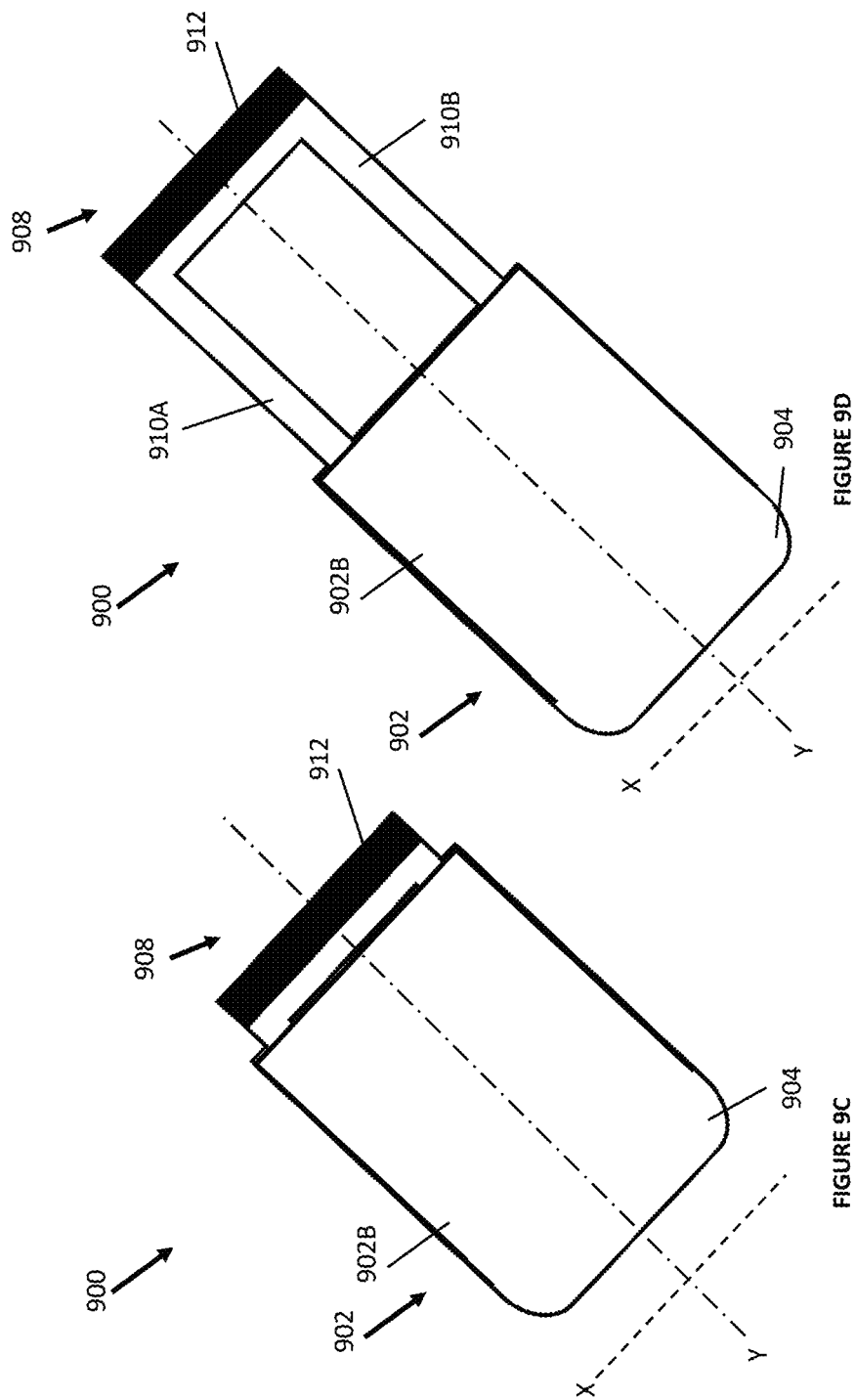

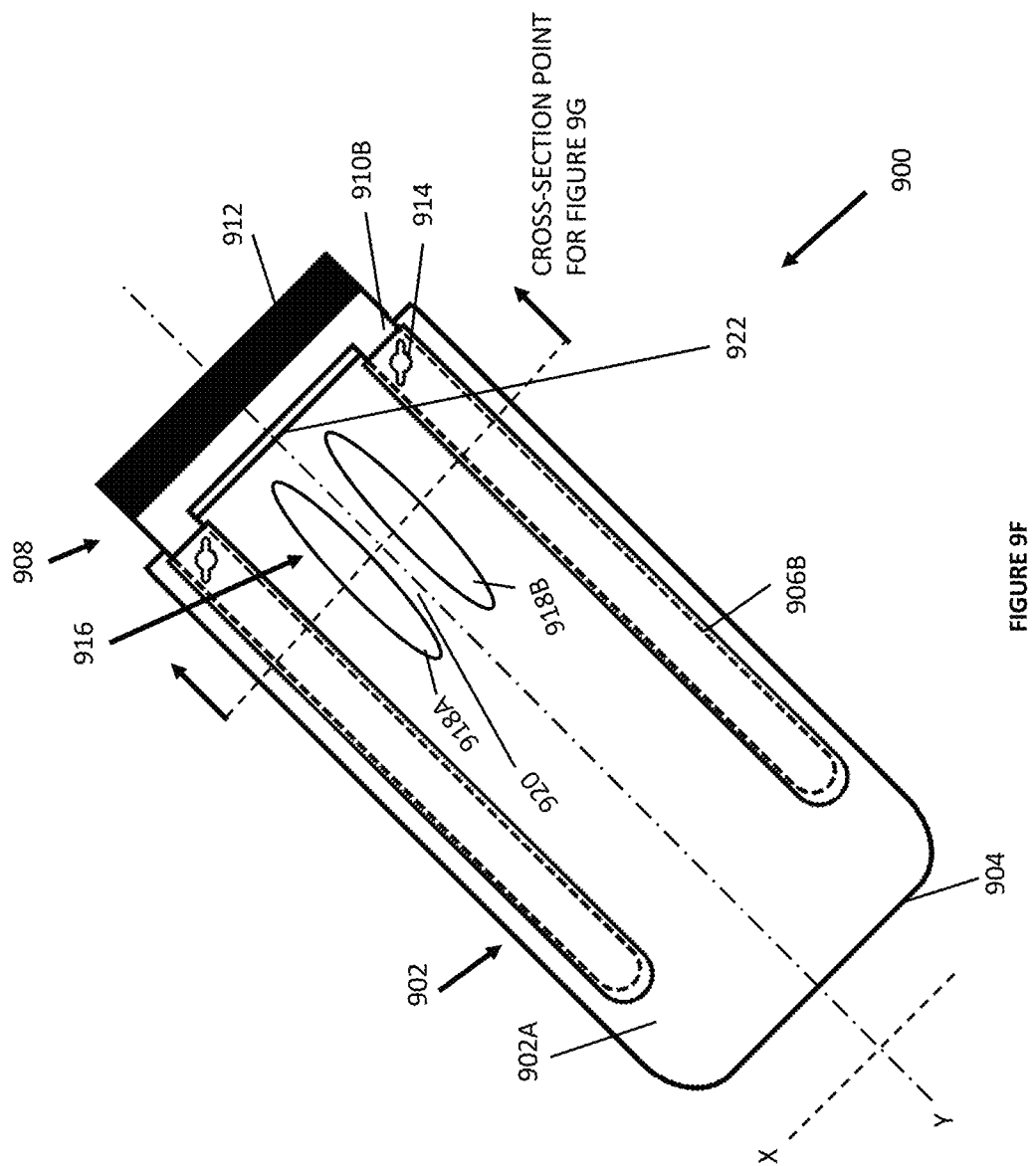

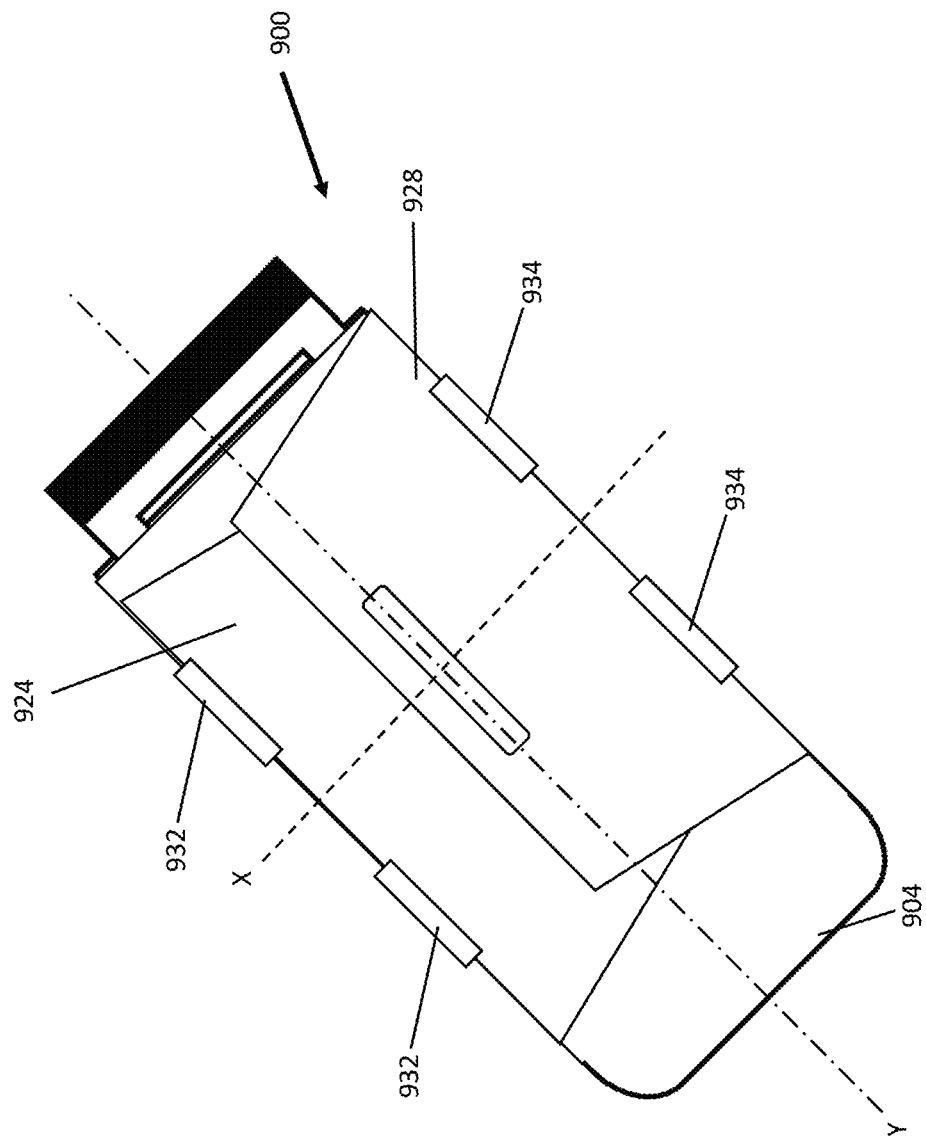

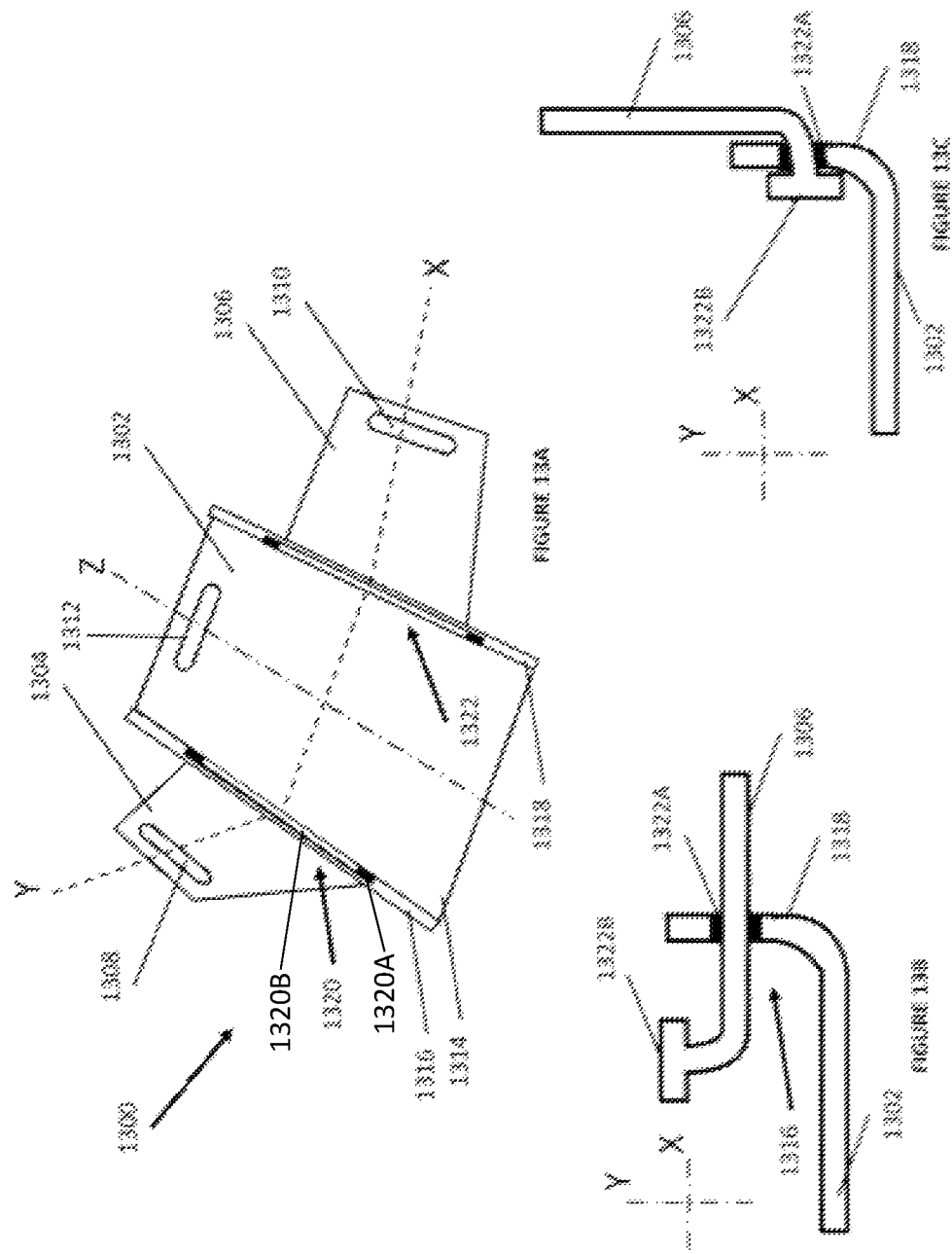

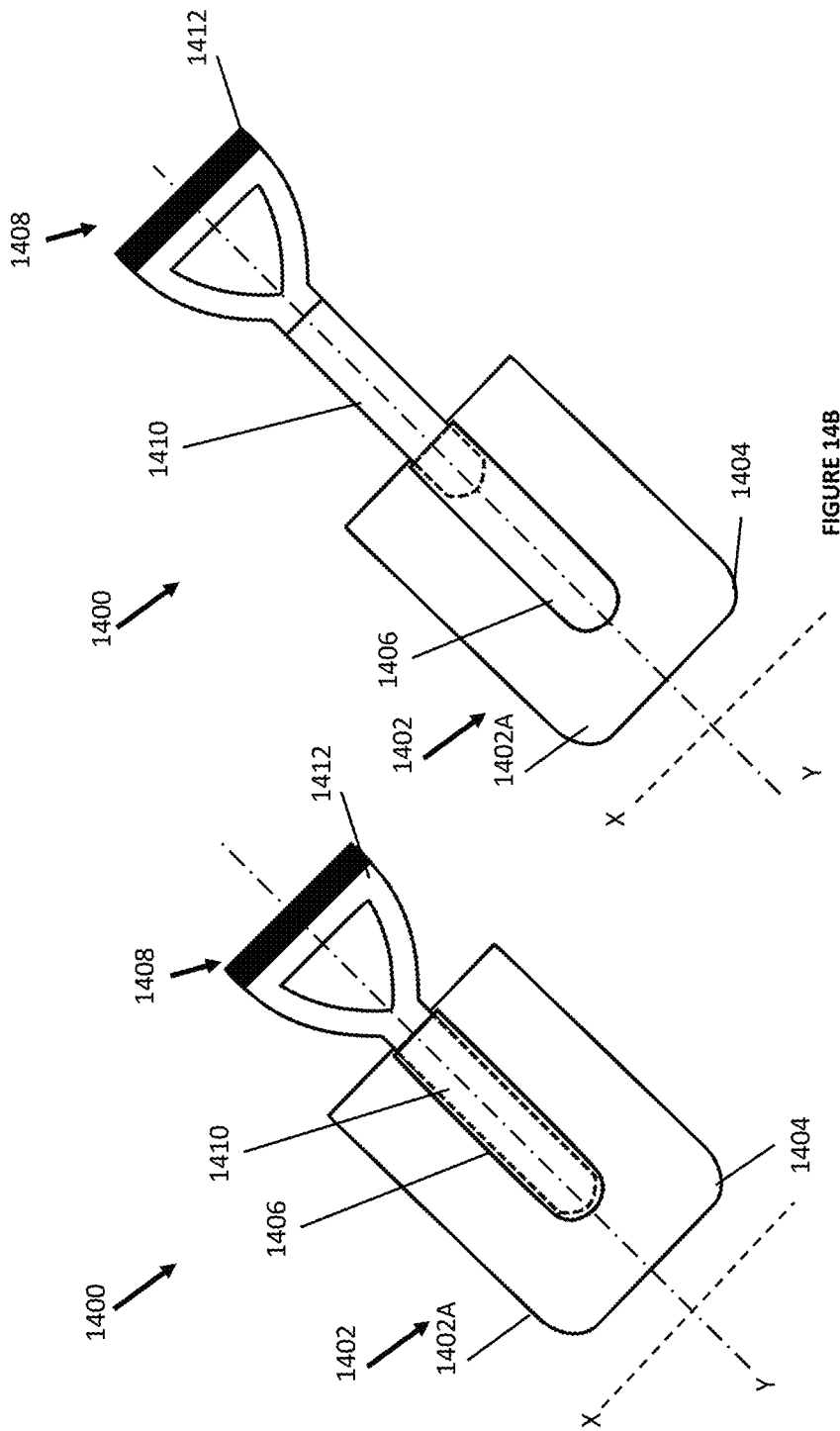

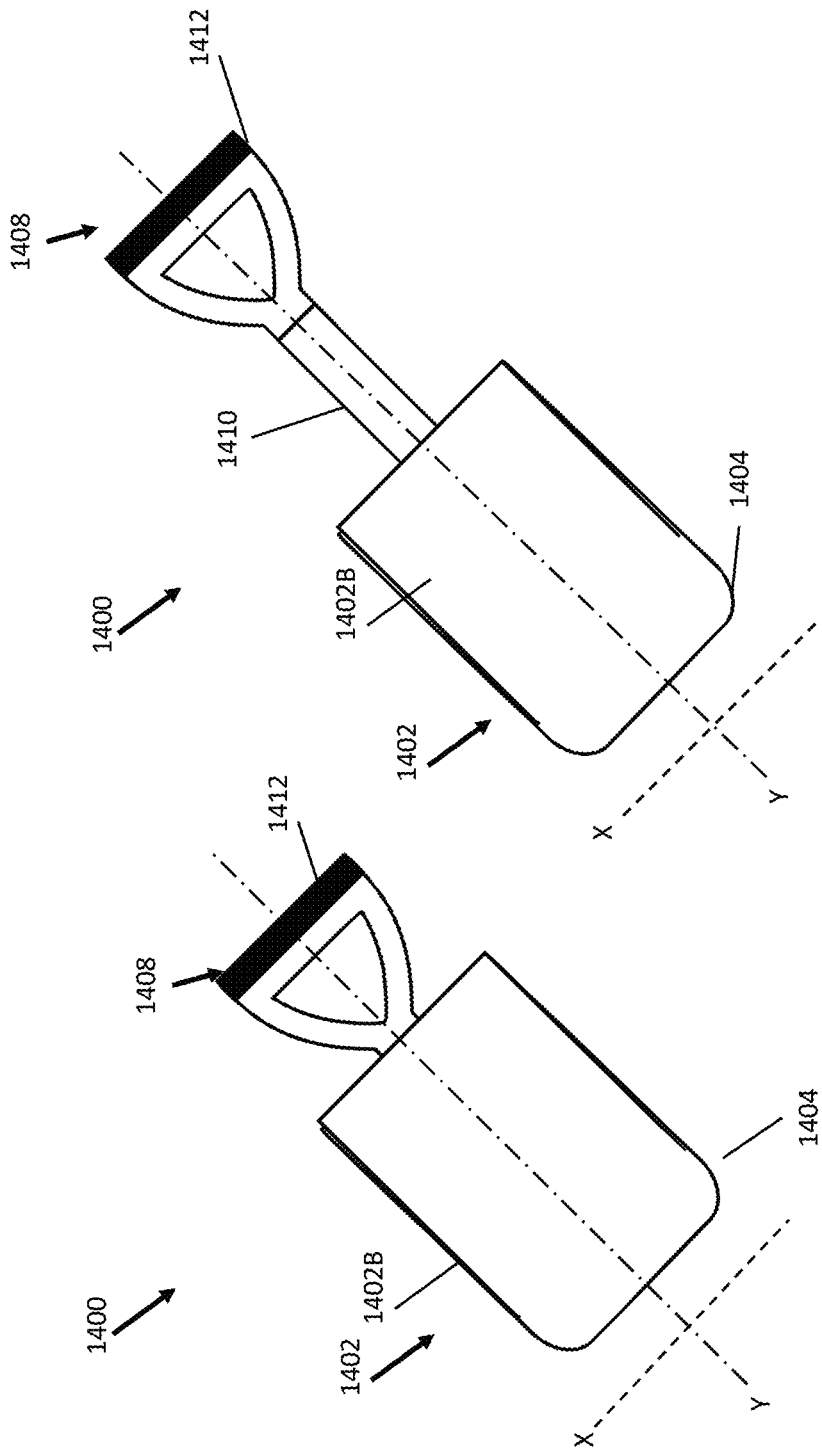

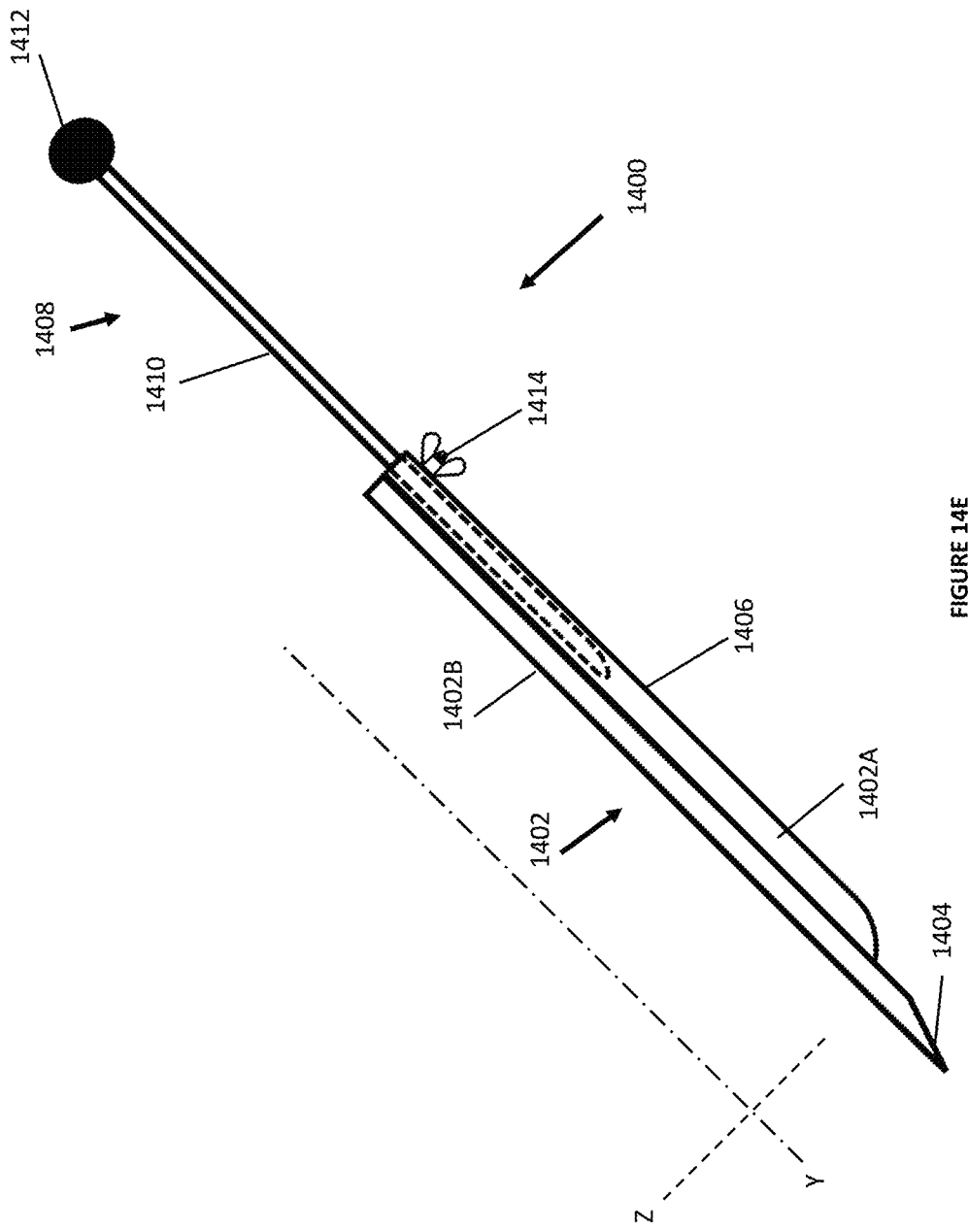

FOLDABLE SHOVEL

FIELD OF THE INVENTION

The present invention relates to manual tools. More particularly, the present invention relates to manual digging and shoveling tools.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The prior art includes a wide variety of shovels and spades that provide blades useful to dig or shovel into various solid or semi-solid substances, such as ice, earth, mud, snow and mixtures of organic and inorganic material. In many applications such as climbing and hiking, light weight tools of reduced size are preferred in order to reduce the carrying burden placed on a bearer of a tool. Quickly deployable devices are also preferred in environments where life threatening conditions can unexpectedly and rapidly present and immediate access to a functional digging or shoveling tool can be required to avert casualties or minimize injury, such as in the event of an avalanche.

Yet the prior art fails to provide tools that are optimally designed to shield the user in a carrying position while enabling easy deployment from a carrying position to a shoveling configuration. Specifically, many prior art tools' carrying position includes hazards for the carrier if he or she should stumble or fall down, such as a handle grip that tends to be positioned to dig into one's vertebrae and potentially cause injury. Furthermore, the prior art fails to optimally provide for lightweight digging or shoveling tools that can be grasped and manipulated by a user with a single hand to shovel or dig. Further, many prior art collapsible shovels tend to be flimsy or breakable. Additionally, several prior art collapsible or portable shoveling devices are not very intuitive to assemble quickly or easily, making these suboptimal for deployment in a real emergency when a user might be injured or panicking.

There is, therefore, a long-felt need in the art of portable shoveling tool manufacture to better address at least some of the above-mentioned shortcomings common to collapsible or portable shovels as currently known in the art, and to produce a more optimal portable shoveling tool.

SUMMARY OF THE INVENTION

Towards these and other objects of the method of the present invention (hereinafter, "the invented method") that are made obvious to one of ordinary skill in the art in light of the present disclosure, an invented device is provided that is usable as a shoveling tool and can be folded up for portability.

A first category of preferred embodiments of the invented device generally includes a shovel blade and two handle elements, wherein each handle element is coupled to an opposing side of the shovel blade. The two handle elements each include a gripping feature and may be alternately placed into (a.) a carrying position; and (b.) a deployed position. In the deployed position, the two gripping features are positioned for simultaneously grasping by a same human hand. In the carrying position, each handle element is positioned closer and more parallel to the shovel blade than as oriented in the deployed position.

In a first alternate preferred embodiment of the invented device, at least one handle element extends through an aperture of the shovel blade, wherein the extending handle element is transitioned between the carrying position and the deployed position by alternating the relative orientation of the extending handle element with respect to the shovel blade aperture.

In a second preferred alternate embodiment of the invented device, at least one handle element is rotatably coupled to the shovel blade.

In a third preferred alternate embodiment of the invented device shovel blade may have two blade edges, wherein each blade edge is adapted for manually forced engagement with the material to be shoveled or displaced.

One or both handle elements may include a sheet with a handle aperture, wherein a user may extend a hand through the handle aperture to grasp the device and employ the device in shoveling or displacing matter. Still alternately, the two handle elements may be adapted for simultaneous grasping with a human hand by extension through a separate handle aperture of each handle element while the invented device presents the deployed position.

In a yet other alternate preferred embodiment of the invented device, one or more handles or handle elements may alternately or additionally be detachable from the shovel blade.

In still other alternate preferred embodiments of the invented device, the shovel blade may have a length dimension and a width dimension having an aspect ratio greater than 2:1 or greater than 10:1.

A second category of preferred embodiments of the invented device generally includes a shovel blade coupled to a single-piece shovel shaft with a grip handle, such that the shovel can be collapsed for portability by sliding the shaft into an indentation on the back of the shovel blade, with the grip handle fitting entirely behind the shovel blade.

The retractable shovel shaft may consist of a single elongate bar, or may vary in shape to better structurally support the blade of the shovel, such as by forming a U-shaped end that cradles the blade of the shovel on either side. Naturally, the shape and quantity of indentations on the back of the shovel blade would vary such that a handle belonging to whichever particular embodiment can retract properly.

The invention may provide or include a shovel comprising: a blade, the blade having a blade edge, a right edge extending from the blade edge, and a left edge extending from the blade edge; a right handle, the right handle rotatably coupled with the blade right edge and comprising a right handle aperture; and a left handle, the left handle rotatably coupled with the blade left edge and comprising a second handle aperture, whereby the right handle and the left handle are adapted to be simultaneously grasped by a same human hand when the right handle and the left handle are rotated toward a center axis of the blade. The right handle and the left handle may be further adapted to be pressed together by a same human hand when the right handle and the left handle are rotated toward a center axis of the blade. The right handle and the left handle may be further adapted to be pressed together by a same human hand when the right handle and the left handle are rotated toward a center axis of the blade and the right handle is at an end of its extension range. The right handle and the left handle may be adapted to be pressed together by a same human hand when the right handle and the left handle are rotated toward a center axis of the blade and the left handle is at an end of its extension range. The right handle may be positionable substantively parallel with the blade along a blade transverse axis. The left blade may be positionable substantively parallel with the blade along a blade transverse axis. The right handle may be positionable substantively parallel with the blade along a blade transverse axis. The shovel may further comprise a second blade edge, the second blade edge extending from the blade right edge to the blade left edge, whereby the shovel has two digging edges. The right handle may comprise a right handle sheet, wherein the right handle is rotatably coupled with the blade right edge and the right handle sheet forms a right handle aperture, the right handle aperture adapted to accept a passage of the human hand. The right handle aperture and the left handle may be adapted to be accept passage of a same human hand when the right handle and the left handle are rotated toward a center axis of the blade. The left handle may comprise a left handle sheet, wherein the left handle is rotatably coupled with the blade left edge and the left handle sheet forms a left handle aperture, the left handle aperture adapted to accept a passage of the human hand. The right handle and the left handle may be adapted to be pressed together by a same human hand when the right handle and the left handle are rotated toward a center axis of the blade and the right handle is at end of its extension range. The right handle and the left handle may be adapted to be pressed together by a same human hand when the right handle and the left handle are rotated toward a center axis of the blade and the left handle is at end of its extension range. The left handle may be positionable substantively parallel with the blade along a blade transverse axis. The right handle may comprise a right handle sheet, wherein the right handle is rotatably coupled with the blade right edge and the right handle sheet forms a right handle aperture, the right handle aperture adapted to accept a passage of the human hand. The right handle and the left handle may be adapted to be pressed together by a same human hand when the right handle and the left handle are rotated toward a center axis of the blade and the right handle is at end of its extension range. The right handle and the left handle may be adapted to be pressed together by a same human hand when the right handle and the left handle are rotated toward a center axis of the blade and the left handle is at end of its extension range. The right handle may be positionable substantively parallel with the blade along a blade transverse axis.

An invented shovel may also comprise: a blade; a detachable left handle, the left handle adapted for detachable rotatable coupling with the blade; and a detachable right handle, the right handle adapted for detachable rotatable coupling with the blade.

An invented shovel may also comprise: a blade; a first handle element having a handle aperture, the first handle rotatably coupled with the blade; and a second handle element having a handle aperture, the second handle rotatably coupled with the blade.

An invented shovel may also comprise: a blade having a front edge, a distally positioned back end and a handle receiver, the handle receiver disposed between the front edge and back end; and a handle, the handle comprising an elongate shaft coupled with a grip, wherein the elongate shaft is slidably coupled with the handle receiver, wherein the grip is sized to rest between the blade front edge and the blade back end when the elongate shaft is slid within the receiver to present a travel mode of the shovel. The grip may comprise a grip bar that extends along a grip axis positioned perpendicularly to a central shaft axis of the elongate shaft, wherein the central shaft axis extends along an elongate dimension of the elongate shaft. The handle may further comprise a central connecting element extending from a center of the grip bar and coupling the grip with the elongate shaft. The handle may further comprise a first grip connecting element extending from a first end of the grip bar and coupling the grip with the elongate shaft. The handle may further comprise a second grip connecting element extending from a second end of the grip bar and coupling the grip with the elongate shaft.

The grip bar may extend for greater than three inches along the grip axis. The grip bar may extend for less than six inches along the grip axis. The shovel may further comprise a first positioning means adapted to detachably retain the elongate shaft in a digging position wherein the grip is positioned distally from the shovel and along a central blade access, the central blade axis extending centrally through the handle receiver of the blade. The first positioning means comprises a spring loaded pin feature coupled with the blade and the elongate shaft comprises a pin receiver, the pin receiver sized, shaped and positioned to removably receive a first pin of the spring loaded pin feature whereby the shovel is maintained in the digging position. The spring loaded pin feature may further comprise a second ping and the pin receiver is sized, shaped and positioned to removably receive the second pin of the spring loaded pin feature when the shovel is maintained in the digging positioned. The shovel may further comprise a travel positioning means adapted to detachably retain the elongate shaft in a travel mode wherein the grip is maintained between the blade front edge and the blade back end. The shovel may further comprise a travel positioning means adapted to detachably retain the elongate shaft in the travel mode, wherein the grip is maintained between the blade front edge and the blade back end. The handle receiver defines an elongate channel adapted to slidably receive at least a portion of the elongate shaft of the handle.

An invented shovel may also comprise: a blade having a front edge, a distally positioned back end, a first receiver and a second receiver, the first receiver and the second receiver disposed between the front edge and back end, and the first receiver positioned distally from second receiver and; a handle, the handle comprising a first elongate shaft and a second elongate shaft coupled with a grip, wherein the first elongate shaft is slidably coupled with the first receiver and the second elongate shaft is slidably coupled with the second receiver, wherein the grip is sized to rest between the blade front edge and the blade back end when the elongate shaft is slid within the receiver to present a travel mode of the shovel. The grip comprises a grip bar that extends from an outer end of the first elongate shaft and to an outer end of the second elongate shaft. The grip bar extends along a grip axis positioned perpendicularly to a central shaft axis that is parallel to both the first elongate shaft and the second elongate shaft, wherein the central shaft axis extends along an elongate dimension defined in common with the first elongate shaft and the second elongate shaft. The shovel may further comprise a travel positioning means adapted to detachably retain the elongate shaft in the travel mode, wherein the grip is maintained between the blade front edge and the blade back end. The shovel may further comprise a first positioning means adapted to detachably retain the elongate shaft in a digging position wherein the grip is positioned distally from the shovel and along a central blade access, the central blade axis extending centrally through the handle receiver of the blade. The shovel may further comprise a travel positioning means adapted to detachably retain the elongate shaft in the travel mode, wherein the grip is maintained between the blade front edge and the blade back end. The first receiver may define a first elongate channel adapted to slidably receive at least a portion of the first elongate shaft of the handle. The first receiver may define a first elongate channel adapted to slidably receive at least a portion of the first elongate shaft of the handle.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

INCORPORATION BY REFERENCE

All publications mentioned herein are incorporated herein by reference to disclose and describe the methods and/or materials in connection with which the publications are cited. All publications, patents, and patent applications mentioned in this specification are herein incorporated by reference in their entirety and for all purposes to the same extent as if each individual publication, patent, or patent application was specifically and individually indicated to be incorporated by reference.

Such incorporations include U.S. Pat. No. 9,359,733B2 (inventor: Gehman; issued on Mar. 1, 2012) titled "Folding snow shovel"; U.S. Pat. No. 5,676,412A (inventor: Kahley; issued on Oct. 14, 1997) titled "Folding snow shovel"; U.S. Pat. No. 9,255,369B2 (inventor: Spataro; issued on Feb. 9, 2016) titled "Collapsible shovel handle"; U.S. Pat. No. 5,951,078A (inventor: Whitehead; issued on Sep. 14, 1999) titled "Expandable snow tools for vehicles"; U.S. Pat. No. 6,113,168A (inventor: Jeor; issued on Sep. 5, 2000) titled "Compact snow digging implement"; US U.S. Pat. No. 7,730,581B2 (inventor: Mirick; issued on Jun. 8, 2010) titled "Weld-on barrel hinge"; and U.S. Pat. No. 9,695,621B2 (inventor: Walhorn; issued on Jul. 4, 2017) titled "Hinged door with hinge plate".

In addition, each and all publications, patents, and patent applications mentioned in this specification are herein incorporated by reference to the same extent in their entirety and for all purposes as if each individual publication, patent, or patent application was specifically and individually indicated to be incorporated by reference. The publications discussed or mentioned herein are provided solely for their disclosure prior to the filing date of the present application.

Nothing herein is to be construed as an admission that the present invention is not entitled to antedate such publication by virtue of prior invention. Furthermore, the dates of publication provided herein may differ from the actual publication dates which may need to be independently confirmed.

BRIEF DESCRIPTION OF DRAWINGS

The detailed description of some embodiments of the invention is made below with reference to the accompanying figures, wherein like numerals represent corresponding parts of the figures.

FIG. 1B is a diagram presenting a side view of the first embodiment of the invented foldable shovel of FIG. 1A in a deployed state and configured for shoveling or displacing material;

FIG. 1C is a diagram presenting a front view of the first embodiment of the invented foldable shovel of FIG. 1A in a folded stated and configured for carrying;

FIG. 2A illustrates a second embodiment of the invented foldable shovel in an opened state and in a front view;

FIG. 2B is a side view of the second embodiment of the invented foldable shovel of FIG. 2A in a deployed state and configured for shoveling or displacing material;

FIG. 2C is a front view of the second embodiment of the invented foldable shovel of FIG. 2A in a folded stated and configured for carrying;

FIG. 3A is a detailed dimensioned front view of the shovel blade of the second embodiment of the invented foldable shovel of FIG. 2A;

FIG. 3B is a detailed cut-away side view of the shovel blade of the second embodiment of the invented foldable shovel of FIG. 2A;

FIG. 4A is a detailed front view of the first sheet of the second embodiment of the invented foldable shovel of FIG. 2A;

FIG. 4B is a detailed front view of the second sheet of the second embodiment of the invented foldable shovel of FIG. 2A;

FIG. 5 is an exploded front view of a third embodiment of the invented foldable shovel having detachable handle sheets;

FIG. 6 is front view of a fourth embodiment of the invented foldable shovel having an aspect ratio 10:1 or greater of blade length to blade width;

FIG. 7 is a perspective view of the fourth version of the invented foldable shovel of FIG. 6 having a detachable strap;

FIG. 9A is a cutaway back view of a fifth embodiment of the invented foldable shovel, in a retracted position for carrying or storage;

FIG. 9B is a cutaway back view of the fifth embodiment of FIG. 9A, in an extended position for digging;

FIG. 9C is a front view of an fifth embodiment of FIG. 9A, in a retracted position for carrying or storage;

FIG. 9D is a front view of the fifth embodiment of FIG. 9A, in an extended position for digging;

FIG. 9F is a cutaway back view of the fifth embodiment of FIG. 9A, in a retracted position, and having additional preferred features including a longer body and a body grip assembly;

FIG. 9J is a view of the invented shovel of FIG. 9H with the side panels in a folded position;

FIG. 13A is a perspective view of an eighth embodiment of the invented collapsible shovel in a partially deployed position;

FIG. 13B is a cross section view of the rotational coupling of the eighth shovel of FIG. 13A between a left or right blade edge and a first or second handle sheet when in an undeployed position;

FIG. 13C is a cross section view of the rotational coupling of the eighth shovel of FIG. 13A between a left or right blade edge and a first or second handle sheet when in a deployed position;

FIG. 14A is a cutaway back view of a ninth embodiment of the invented foldable shovel, in a retracted position for carrying or storage;

FIG. 14B is a cutaway back view of the ninth embodiment of FIG. 14A, in an extended position for digging;

FIG. 14C is a front view of a ninth embodiment of FIG. 14A, in a retracted position for carrying or storage;

FIG. 14D is a front view of the ninth embodiment of FIG. 14A, in an extended position for digging;

FIG. 14E is a cutaway side view of the ninth embodiment of FIG. 14A, in a partially extended position for digging;

DETAILED DESCRIPTION OF DRAWINGS

Figure 1A:
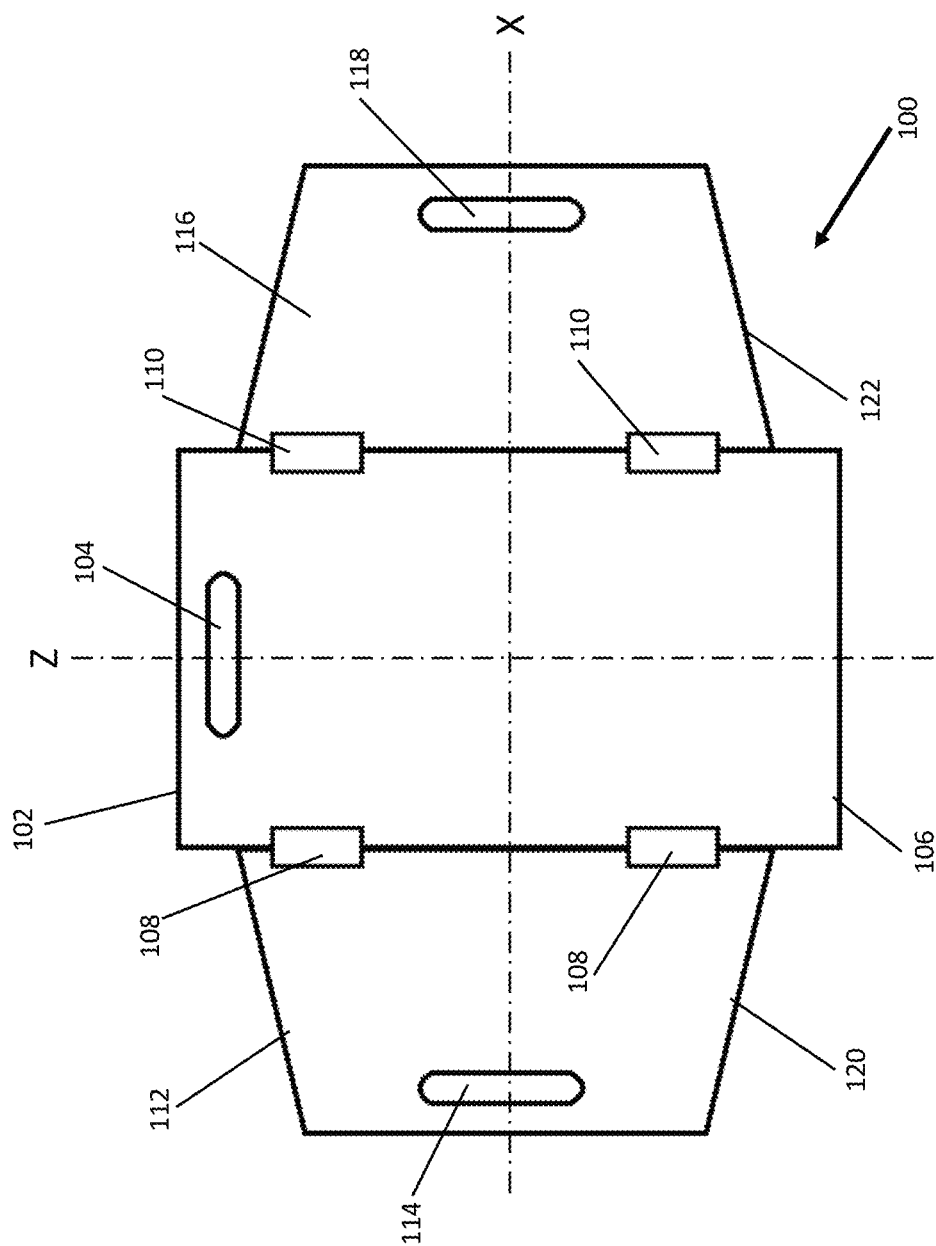
FIG. 1A is a diagram presenting a first embodiment of the invented foldable shovel in an opened state and in a front view.

In the following detailed description of the invention, numerous details, examples, and embodiments of the invention are described. However, it will be clear and apparent to one skilled in the art that the invention is not limited to the embodiments set forth and that the invention can be adapted for any of several applications.

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims. Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

When elements are referred to as being "connected" or "coupled," the elements can be directly connected or coupled together or one or more intervening elements may also be present. In contrast, when elements are referred to as being "directly connected" or "directly coupled," there are no intervening elements present.

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims. Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Throughout this specification, like reference numbers signify the same elements throughout the description of the figures.

Regarding hinges and hinge assemblies as disclosed herein, a hinge assembly may be, comprise, or include a mechanical bearing that connects two solid objects, allowing these two objects to rotate relative to each other about a fixed axis of rotation. A hinge assembly may be a barrel hinge, as found on a door or in most other hinge implementations, comprising two leaves forming knuckles around a hollow barrel through which a pin is secured, though other models of hinge are known in the art such as but not limited to a Butt/Mortise hinge, Butterfly/Parliament (UK) hinge, Case hinge, Concealed hinge, Continuous/Piano/Coffin hinge, Flag hinge, H hinge, HL hinge, Pivot hinge, Self-closing hinge, Spring hinge, Living hinge, Coach hinge, Counterflap hinge, Cranked hinge or storm-proof hinge, Double action non-spring hinge, Double action spring hinge, Flush hinge, Friction hinge, Lift-off hinge, Pinge (A hinge with a quick release pin), Rising butt hinge, Security hinge, or Tee hinge. Usage of "hinge assembly" herein may be taken to signify a mechanical bearing suitable for rotatably coupling two objects together, allowing these two objects to rotate relative to each other about a fixed axis of rotation, namely the pin of the hinge, as described above and known in the art, and that any variety of hinge which is found suitable by one skilled in the art of manufacture for the indicated application as disclosed may be utilized.

Each of the Figures presented herein includes axes X, Y, and Z indicating directional orientation of each drawing. The following convention is observed throughout the Figures. The width of each shovel blade and shovel body is considered the left-to-right dimension, and is represented by and measured along the X axis. The up-and-down height dimension is represented by the Y axis. The front-to-back width dimension is represented by the Z axis. The X axis is orthogonal to both the Y and Z axes; the Y axis is orthogonal to both the X and the Z axes; the Z axis is orthogonal to both the X and Y axes. If an axis is not visible in a Figure, it is understood that this is because the axis not presented is parallel to the reader's line of sight, making that axis 'invisible' from the presented viewing angle or else best represented solely as the intersection point of the other two axes.

Referring now generally to the Figures, and particularly to FIGS. 1A through 1E, FIG. 1A through 1E are diagrams presenting a first embodiment of an invented foldable shovel ("a first shovel 100").

Referring now generally to the Figures, and particularly to FIG. 1A, FIG. 1A is a view of the first shovel 100 in an unfolded state and in a front view. The first shovel 100 includes a center panel 102 having a back handle aperture 104, a blade 106, one or more left hinge assemblies 108, and one or more right hinge assemblies 110; a left panel 112 rotatably coupled to the center panel 102 by the left hinge assemblies 108 and including at least a left handle aperture 114; and a right panel 116 rotatably coupled to the center panel 102 by the right hinge assemblies 110 and including at least a right handle aperture 118. In preferred application, a user 150 as presented in FIGS. 1D and 1E may fold the left panel 112 and right panel 116 upward from a flat position and inward, to form a triangular shape with the center panel 102 as the base and the left handle 114 and right handle 118 proximal to each other at the apex of the triangular shape, as presented in FIG. 1B. A user 150 as presented in FIGS. 1D and 1E would preferably grip the left handle 114 and the right handle 118 together in the same hand, and optionally grip the back handle 104 with the other hand for additional leverage, such that this user 150 as presented in FIGS. 1D and 1E can use the first shovel 100 as a two-handed scooping tool for a substance 152 as presented in FIGS. 1D and 1E, such as snow or dirt. To facilitate this and similar applications, the blade 106 may optionally be sharp or tapered, and a left panel edge 120 and right panel edge 122 may be similarly adapted for better shoveling performance.

Referring now generally to the Figures, and particularly to FIG. 1B, FIG. 1B is a side view of the first shovel 100 in a deployed state and configured for shoveling. The right handle aperture 118 and the left handle aperture 114 are adapted to be simultaneously grasped by the same human hand when the positions of the right handle and the left handle are rotated toward a center axis 124 of the blade 106. Additionally or alternatively, the right handle aperture 118 and the left handle aperture 114 may be adapted to be pressed together by a same human hand when the right handle aperture 118 and the left handle aperture 114 are each rotated toward the center axis 124 of the blade 106, and/or when either (a.) the right handle aperture 118 is rotated toward the center axis 124 of the blade 106 and the right handle aperture 118 is at an end of its extension range; and/or (b.) the left handle aperture 114 is rotated toward center axis 124 of the blade 106 and the left handle aperture 114 is at an end of its extension range. In certain preferred embodiments, either the left panel 112 or the right panel 116 may also have a shaped lip 126 to assist in fitting the left panel 112 and right panel 116 together at the apex as shown. For further information regarding grip and application of the first shovel 100, FIGS. 1D and 1E present the first shovel being gripped and used by a user 150.

It is understood that the basic premise of the invention is not limited to the exact details presented herein, and that a similar foldable shovel performing the same function may be constructed with some obvious features changed, such as handles that are not apertures, or other fastening means besides hinge assemblies and/or a lip. Any such variations should be considered embodiments of the present invention, unless specifically excluded by the claims.

Referring now generally to the Figures, and particularly to FIG. 1C, FIG. 1C is a front view of the first shovel 100 in a folded state and configured for carrying by a user; as though one were looking downward upon the deployed shovel of Figure B. As shown in FIG. 1C, the right handle aperture 118 is positioned proximate to, and substantively parallel with, the blade 106 along a blade 106 transverse axis 128. In addition, the left handle aperture 114 is also presented in FIG. 1C as proximate to and substantively parallel with the blade 106 along the blade 106 transverse axis 128.

Figure 1D:
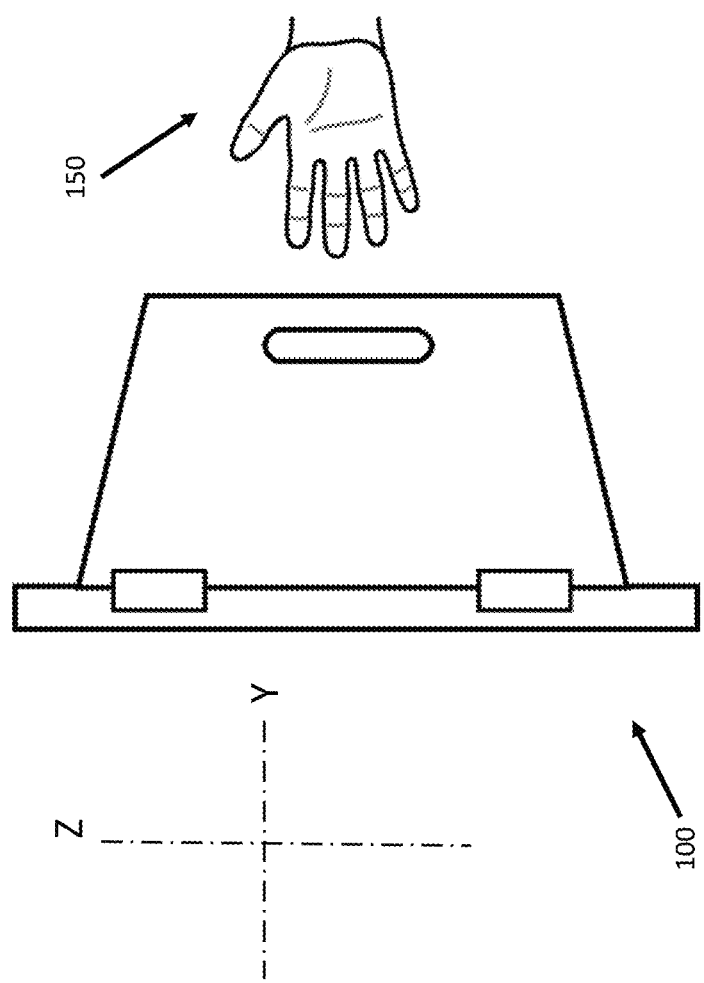
FIG. 1D is a perspective view of the first embodiment of the invented foldable shovel of FIG. 1A in a deployed state, about to be gripped by a human hand.
Figure 1E:
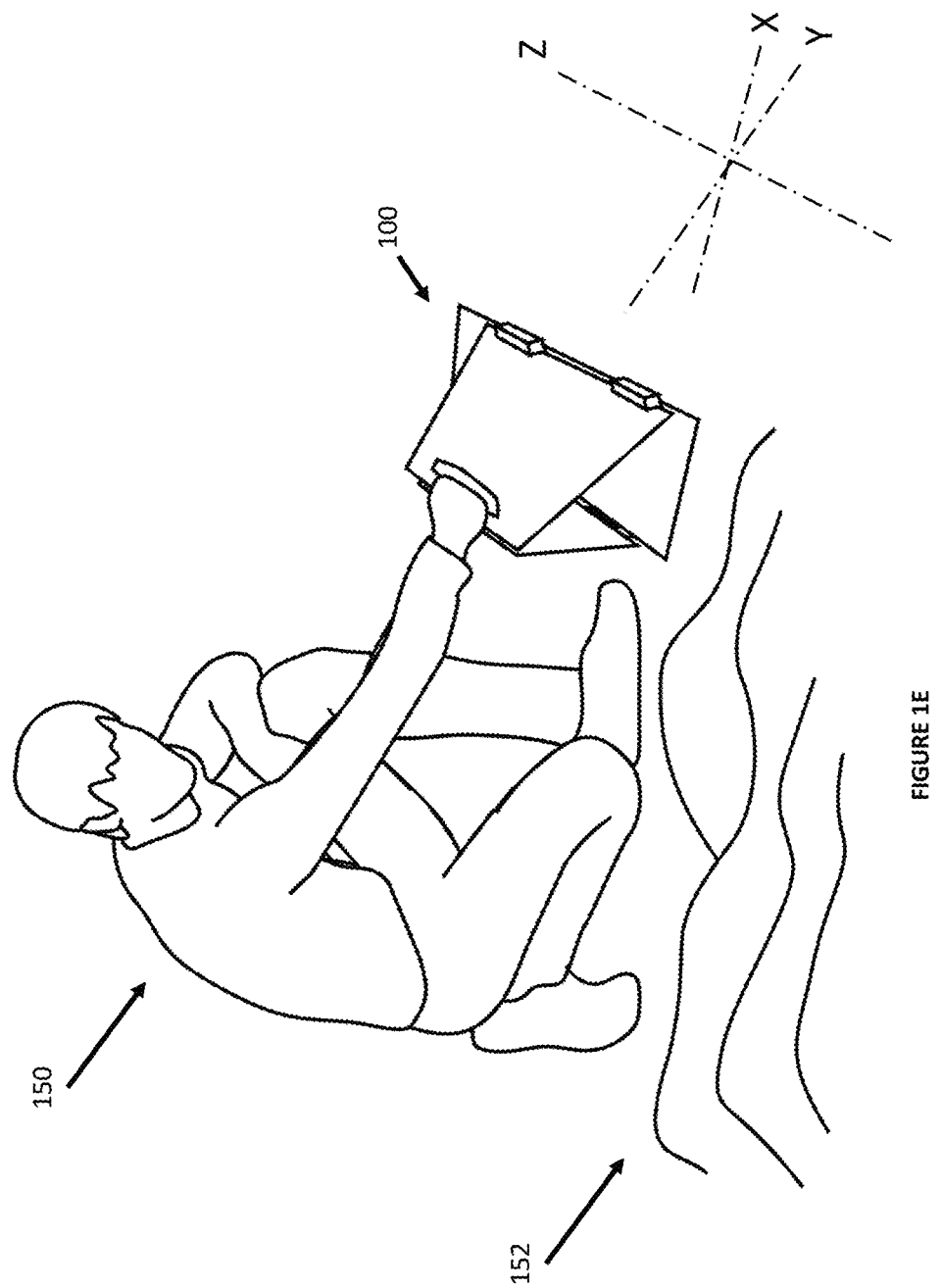
FIG. 1E is a perspective view of the first embodiment of the invented foldable shovel of FIG. 1A in a deployed state and being utilized by a user shoveling material.

Referring now generally to the Figures, and particularly to FIG. 1D, FIG. 1D is a perspective view of the first shovel 100 in a deployed state and being gripped by a user 150. As shown in FIG. 1C and FIG. 1A, the first shovel 100 may include a second blade edge, which may be placed substantively parallel to the first blade edge, and may extend between the right and left handle sheets whereby the blade provides two digging edges for the purpose of bidirectional shoveling. This second blade edge may still include a back handle aperture 104, or omit this element.

Referring now generally to the Figures, and particularly to FIG. 1E, FIG. 1E is a diagram presenting the user 150 gripping the first shovel 100 and using the first shovel 100 to shovel, scoop, relocate, or displace a material 152 such as snow, mud, or dirt. It is noted that the user 150 may prefer different postures for shoveling besides the one depicted, such as bending over or crouching from a standing position, depending on the physical ability of the user 150 and the resistance, density, or weight of the material 152. This diagram should not be viewed as indicating or limiting that the depicted posture or mode of shoveling is the only correct one, or even the most preferred or recommended, but rather to indicate where the invented first shovel 100 fits into a shoveling context as a tool that can be wielded by the user 150 to effectively scoop the material 152.

It is noted that a preferred application for the first shovel 100 and other similar collapsible shovels herein is particularly as an emergency tool such as a scooping shovel for use in the event of an avalanche. If one is going hiking or camping in a snowy or mountainous area, it may be wise to pack along a portable shovel in case one needs to dig a hole, or, more critically, in case there's an avalanche and the ability to shovel large amounts of snow effectively could be a matter of life and death. However, several prior art portable shovels are found to be not very helpful in this kind of emergency situation; these can be flimsy, fragile, or have a low capacity for how much material 152 they can move in one scoop; they can be difficult to assemble (particularly by someone who may be panicking or injured), or designed for digging small holes but ineffective in shifting the aftermath of an avalanche enough to rescue a buried person or dig oneself out of danger. The present invention endeavors to offer a portable shovel which may provide at least the benefits of being simple to use and assemble, lightweight and portable, and also significantly less likely to cause injury if someone carrying the invention should trip and fall on top of the shovel they're carrying, making several embodiments of the present invented shovel particularly ideal for inclusion in one's hiking gear as an emergency avalanche rescue tool.

Referring now generally to the Figures, and particularly to FIGS. 2A through 4B, FIGS. 2A through 4B are diagrams presenting a second embodiment of the invented foldable shovel ("a second shovel 200").

Referring now generally to the Figures, and particularly to FIG. 2A, FIG. 2A is a rear view of the second shovel 200 in an opened state. The second shovel 200 includes a second center panel 202 having a second back handle aperture 204, a second blade 206, a left attachment structure 208, a right attachment structure 210; a second left panel 212 detachably fitted onto the center panel 202 and including at least a second left handle aperture 214; and a second right panel 216 detachably fitted onto the center panel 202 and including at least a second right handle aperture 218. In preferred application, the user 150 may fold the second left panel 212 and second right panel 216 upward from a flat position and inward, to form a triangular shape with the second center panel 202 as the base and the second left handle 214 and second right handle 218 proximal to each other at the apex of the triangular shape, as presented in FIG. 2B. The user 150 would preferably grip the second left handle 214 and the second right handle 218 together in the same hand, and optionally grip the back handle 204 with the other hand for additional leverage, such that the user 150 can use the first shovel 100 as a two-handed scooping tool. To facilitate this and similar applications, the blade 206 may optionally be sharp or tapered.

Referring now generally to the Figures, and particularly to FIG. 2B, FIG. 2B is a side view of the second shovel 200 in a deployed state and configured for shoveling or displacing material. The second right handle aperture 218 and the second left handle aperture 214 are adapted to be grasped by a same human hand when the second right panel 216 and the second left panel 212 are rotated toward the center axis of the blade 206 and (a.) the second right panel 216 is at an end of its extension range; and/or (b.) the second left panel 214 is at an end of its extension range.

It is noted that the second shovel 200 differs from the first shovel 100 with a few notable features, and also that further recombination of any or all of these different possible features might produce several more embodiments of the claimed invention. As one of these features meriting further discussion, it is noted that the second shovel 200 does not include hinges, and instead implements the left attachment structure 208 and the right attachment structure 210 differently, by shaping of the second center panel 202, second left panel 212, and the second right panel 216 such that the shapes of these elements fit together to keep the second shovel 200 in an open position. More specifically, the left attachment structure 208 is further comprised of the second left panel 212 fitting through a left attachment aperture 220 positioned near a second center panel left side 222 of the second center panel 202, and a left curved edge 224 positioned at a second left panel bottom side 226 fits against the lip of the left attachment aperture 220 and the second center panel 202, such that when the second left panel 212 is fully extended and in position for use as a handle, as explicated above, the position of the left curved edge 224 supports the deployed triangle shape of the second shovel 200, as presented in FIG. 2B. Similarly, the right attachment structure 210 is further comprised of the second right panel 216 fitting through a right attachment aperture 228 positioned near a second center panel right side 230 of the second center panel 202, and a right curved edge 232 positioned proximate to a second right panel bottom side 234 fits against the lip of the right attachment aperture 228 and the second center panel 202, such that when the second right panel 216 is fully extended and in position for use as a handle, as explicated above, the position of the right curved edge 232 supports the deployed triangle shape of the second shovel 200, as presented in FIG. 2B. When the user 150 is not using the second shovel 200, the second left panel 212 may be retracted through the left attachment aperture 220 and the left curved edge 224 dislodged, the second right panel 216 may be retracted through the right attachment aperture 228 and the right curved edge 232 dislodged, and the triangle shape can thus be collapsed, as presented in FIG. 2C. It is noted that in some preferred embodiments, the second center panel 202 may be already shaped into a curve as presented in FIG. 2B and remain curved even when the second shovel 200 is collapsed, and in other preferred embodiments, force exerted to bring the second left handle aperture 214 and the second right handle aperture 218 together may cause the second center panel 202 to bend into the shown curve of FIG. 2B if made of a bendable material such as plastic or aluminum, and flatten out again when the second shovel 200 is collapsed as presented in FIG. 2C. It is further noted that some embodiments of the invented shovel which include the left curved edge 224 and/or the right curved edge 232 may include these elements by means of attaching of a separate, curved piece of material to the second left panel bottom side 226 and the second right panel bottom side 234 respectively, while other embodiments may form the left curved edge 224 and/or the right curved edge 232 by shaping of the edges of the second left panel 212 and the second right panel 216 respectively to form curved shapes appropriate for this fastening implementation.

Referring now generally to the Figures, and particularly to FIG. 2C, FIG. 2C is a front view of the second shovel 200 in a folded stated and configured for carrying by the user. As shown in FIG. 2C, the second right panel 216 is positioned proximate to, and substantively parallel with, the second blade 206 along a blade transverse axis 236. In addition, the second left panel 214 is also presented in FIG. 2C as proximate to and substantively parallel with the second blade 206 along the blade transverse axis 236.

Referring now generally to the Figures, and particularly to FIG. 3A, FIG. 3A is a detailed dimensioned front view of the second center panel 202 of the second shovel 200, with the second left panel 212 and the second right panel 216 detached and not shown. FIG. 3A presents the handle aperture 204 for the passage of a human hand along the side of the second center panel 202 substantively parallel to the second blade 206, the left attachment aperture 220 for the placement of the rotational coupling of the second left panel 212, and the right attachment aperture 228 for the placement of the rotational coupling of the second right panel 216.

FIG. 3B is a detailed cut-away dimensioned side view of the shovel blade of the second shovel 200. The cut-away dimensioned side view shows a more precise placement of the left attachment aperture 220 for the placement of the rotational coupling of the second left panel 212, and the right attachment aperture 228 for the placement of the rotational coupling of the second right panel 216.

FIG. 4A is a detailed dimensioned front view of the second left panel 212 of the second shovel 200 of FIG. 2A, wherein the second left panel 212 contains the second left handle aperture 214 for the passage of the human hand. The second left panel 212 further comprises the left curved edge 224 affixed perpendicularly to the second left panel bottom side 226 substantively parallel to the second left handle aperture 214, which may be inserted into the left attachment aperture 220 of the second center panel 202 of FIGS. 3A and 3B for the purpose of rotationally coupling with the second center panel 202.

FIG. 4B is a detailed dimensioned front view of the second right panel 216 of the second shovel 200 of FIG. 2A, wherein the second right panel 216 contains the second right handle aperture 218 for the passage of the human hand. The second right panel 216 further comprises the right curved edge 232 affixed perpendicularly to the second right panel bottom side 234 substantively parallel to the second right handle aperture 218, which may be inserted into the right attachment aperture 228 of the second center panel 202 of FIGS. 3A and 3B for the purpose of rotationally coupling with the second center panel 202.

Referring now generally to the Figures, and particularly to FIG. 5, FIG. 5 is a diagram presenting an exploded or disassembled view of a third embodiment of the invented foldable shovel ("a third shovel 500"). The third shovel 500 includes a third center panel 502 having a third back handle aperture 504, a third blade 506, an upper left attachment assembly 508A, a lower left attachment assembly 508B, an upper right attachment assembly 510A, a lower right attachment assembly 510B, a third left panel 512 which can be detachably coupled to the center panel 502 and including at least a third left handle aperture 514; and a third right panel 516 which can be detachably coupled to the third center panel 502 and including at least a third right handle aperture 518. In preferred application, once the third shovel 500 is assembled as indicated below, the user 150 may fold the third left panel 512 and third right panel 516 upward from a flat position and inward, to form a triangular shape with the third center panel 502 as the base and the third left handle aperture 514 and third right handle aperture 518 proximal to each other at the apex of the triangular shape, as presented at least in FIGS. 1B and 2B pertaining to other embodiments. The user 150 would preferably grip the third left handle aperture 514 and the third right handle aperture 518 together in the same hand, and optionally grip the third back handle aperture 504 with the other hand for additional leverage, such that the user 150 can use the third shovel 500 as a two-handed scooping tool. To facilitate this and similar applications, the third blade 506 may optionally be sharp or tapered.

Further regarding the upper left attachment assembly 508A, the lower left attachment assembly 508B, the upper right attachment assembly 510A, and the lower right attachment assembly 510B (collectively, "the hook-and-notch attachment assemblies 508-510") each consist of a hook element which fits into a notch element. Specifically, the upper left attachment assembly 508A further consists of an upper left attachment hook 508A.H and an upper left attachment notch 508A.N; the lower left attachment assembly 508B further consists of a lower left attachment hook 508B.H and a lower left attachment notch 50BA.N; the upper right attachment assembly 510A further consists of an upper right attachment hook 510A.H and an upper right attachment notch 510A.N; and the lower right attachment assembly 510B further consists of a lower right attachment hook 510B.H and a lower right attachment notch 510A.N. The upper left attachment hook 508A.H, the lower left attachment hook 508B.H, the upper right attachment hook 510A.H, and the lower right attachment hook 510B.H (collectively, "the attachment hooks 508-10A-B.H") may each be a piece of material (such as but not limited to metal or hard plastic) which is shaped to fit into the corresponding notch, namely the upper left attachment notch 508A.N, the lower left attachment notch 508B.N, the upper right attachment notch 510A.N, and the lower right attachment notch 510B.N (collectively, "the attachment notches 508-10A-B.N") respectively. Likewise, the attachment notches 508-10A-B.N may each be a gap, notch, or hole in the material of the panel upon which the attachment notches 508-10A-B.N are placed, into which the corresponding attachment hooks 508-10A-B.H each fit. In preferred assembly of the third shovel 500, each of the hook-and-notch attachment assemblies 508-510 is coupled by fitting the attachment hooks 508-10A-B.H into their counterpart attachment notches 508-10A-B.N, thus coupling the third left panel 512 and the third right panel 516 to the third center panel 502. Once assembled, the third shovel 500 may be utilized in similar fashion to the first shovel 100, by gripping the left handle aperture 514 and the right handle aperture 518 together to form a triangular scooping tool resembling those of FIGS. 1B and 2B. The hook-and-notch attachment assemblies 508-510 may be conceptualized as a further different variety of coupling structure in place of the left hinge assemblies 108 & the right hinge assemblies 110 of the first shovel 100, or the attachment structures 208 & 210 of the second shovel 200; one may even note that this implementation may allow both for pivoting around the attachment points (as with the left hinge assemblies 108 & the right hinge assemblies 110) and also easy assembly/disassembly (as with the fit-together pieces of the second shovel 200), combining potentially preferable features of both in providing options in available features for this triangular scooping tool.

Referring now generally to the Figures and particularly to FIG. 6, FIG. 6 is a front view of diagrams presenting a fourth embodiment of the invented foldable shovel ("a fourth shovel 600") having an aspect ratio 10:1 or greater of blade length L to blade width W. Other embodiments herein may also have this aspect ratio, but this element is presented and labeled here. The fourth shovel 600 additionally includes a fourth center panel 602 having a fourth back handle aperture 604, a fourth blade 606, a left vertex 608, a right vertex 610, a fourth left panel 612 including at least a fourth left handle aperture 614; and a fourth right panel 616 including at least a fourth right handle aperture 618 (not visible). In preferred application, the user 150 may fold the fourth left panel 612 and fourth right panel 616 upward from a flat position and inward, to form a triangular shape with the fourth center panel 602 as the base and the fourth left handle aperture 614 and fourth right handle aperture 618 proximal to each other at the apex of the triangular shape, as presented at least in FIGS. 1B and 2B pertaining to other embodiments. The user 150 would preferably grip the fourth left handle aperture 614 and the fourth right handle aperture 618 together in the same hand, and optionally grip the fourth back handle aperture 604 with the other hand for additional leverage, such that the user 150 can use the fourth shovel 600 as a two-handed scooping tool. To facilitate this and similar applications, the fourth blade 606 may optionally be sharp or tapered. In this embodiment, instead of barrel hinge assemblies or connection points, the fourth left panel 612 and the fourth right panel 616 may be non-detachably rotatably coupled or part of the same material as the fourth center panel 602, such as in an embodiment where a single shaped sheet of material is folded and the left vertex 608 and right vertex 610 are the creases. It is noted that this kind of implementation is also a type of hinge, namely a mechanical structure rotatably coupling two elements, and that a hinge formed of bendable material, wherein the bending of the material allows the rotation, is sometimes called a "living hinge".

Referring now generally to the Figures and particularly to FIG. 7, FIG. 7 is a perspective view of the fourth shovel 600 configured with a detachable strap 700 which may be coupled onto the fourth shovel 600 for carrying, or decoupled from the fourth shovel 600 when the fourth shovel 600 is in use. It is noted that any embodiment of the invention presented herein may also be equipped with the strap 700 in similar fashion; FIG. 7 presents a representative example of this feature applied to one presented embodiment, and should not be construed as limitation of this possible feature to only the fourth shovel 600 embodiment. The strap 700 is detachably coupled to the fourth shovel 600 by a first strap coupling assembly 702 and a second strap coupling assembly 704, each comprising means for detachably coupling the strap 700 to the fourth shovel 600, such as but not limited to rings, clips, buckles, clasps, and other suitable coupling elements as known in the art and applied to similar purposes. It is noted that some or all elements of either the first strap coupling assembly 702 and the second strap coupling assembly 704 may be affixed to or included in either the fourth shovel 600 or the strap 700, as preferred in the design and manufacture; all elements necessary to affix to the strap 700 may be positioned on the fourth shovel 600, all elements necessary to attach itself to the fourth shovel 600 may be components of the strap 700, or corresponding interlocking elements may be positioned both on the strap 700 and on the fourth shovel 600; any combination of these available implementations may be preferable.

Figure 8:
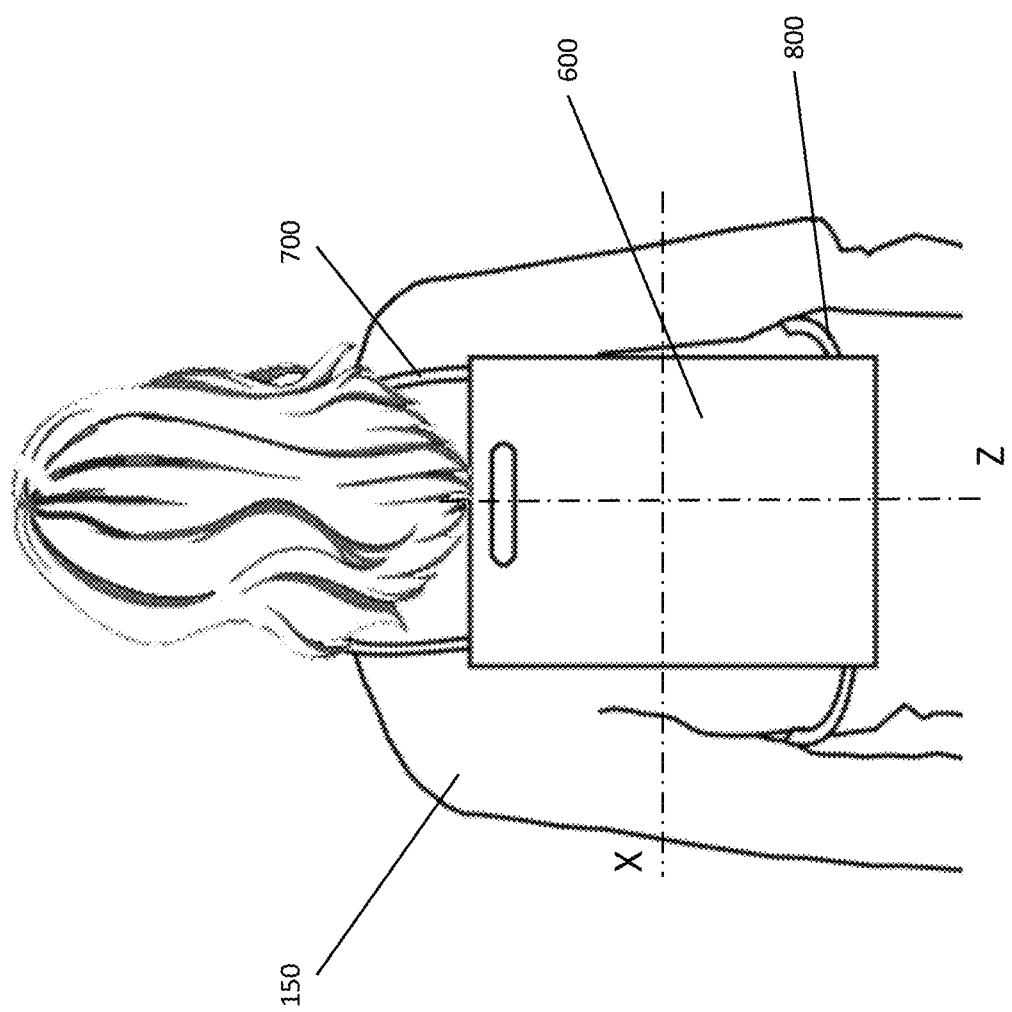
FIG. 8 is a front view of the fourth version of the invented foldable shovel of FIG. 6 having two detachable straps and worn by a user in a carrying position.

Referring now generally to the Figures and particularly to FIG. 8, FIG. 8 is a rear view of the fourth shovel 600 configured with a pair of straps, the strap 700 and a second strap 800, and coupled with a user 150 in a carrying position against the back and shoulders of the user 150. It is noted that the strap 700, the second strap 800, or both may include additional elements to permit the user 150 to easily secure the strap 700 and/or the second strap 800 comfortably around the user 150, such as buckles, hook-and-loop material, elements which tighten/loosen either strap, or similar. Either the strap 700, the second trap 800, or both of these may be coupled onto the fourth shovel 600 for carrying, or decoupled from the fourth shovel 600 when the fourth shovel 600 is in use. It is noted that any embodiment of the invention presented herein may further be equipped with the second strap 800 in similar fashion; FIG. 8 presents a representative example of this feature applied to one presented embodiment, and should not be construed as limitation of this possible feature to only the fourth shovel 600 embodiment. The second strap 800 may be detachably coupled to the fourth shovel 600 by similar means for detachably coupling the second strap 800 to the fourth shovel 600 as those discussed regarding the strap 700, such as but not limited to rings, clips, buckles, clasps, and other suitable coupling elements as known in the art and applied to similar purposes. It is noted that the user 150 is able to carry the fourth shovel 600 as equipped with the strap 700 and the second strap 800 hands-free, that the fourth shovel 600 may alternatively be strapped to the front of the user 150 instead of their back if preferred, and that if the user 150 should trip or fall, the fourth shovel 600 would be unlikely to present as much of an injury risk as a prior art standard or portable shovel carried strapped to one's back or over one's shoulder. The invented collapsible, portable shovel provides at least the substantial advancement of reducing this likelihood of injury, while it isn't unusual for a prior art portable shovel to severely injure someone who falls down while carrying it, such as by digging the blade or handle of the shovel into the vertebrae of the user 150 if carried on the back of the user 150. It is further noted that, depending on the material the shovel is made of, the shovel may also offer some physical protection or armor for the back or other bodily surface over which the shovel is worn.

Figure 9E:
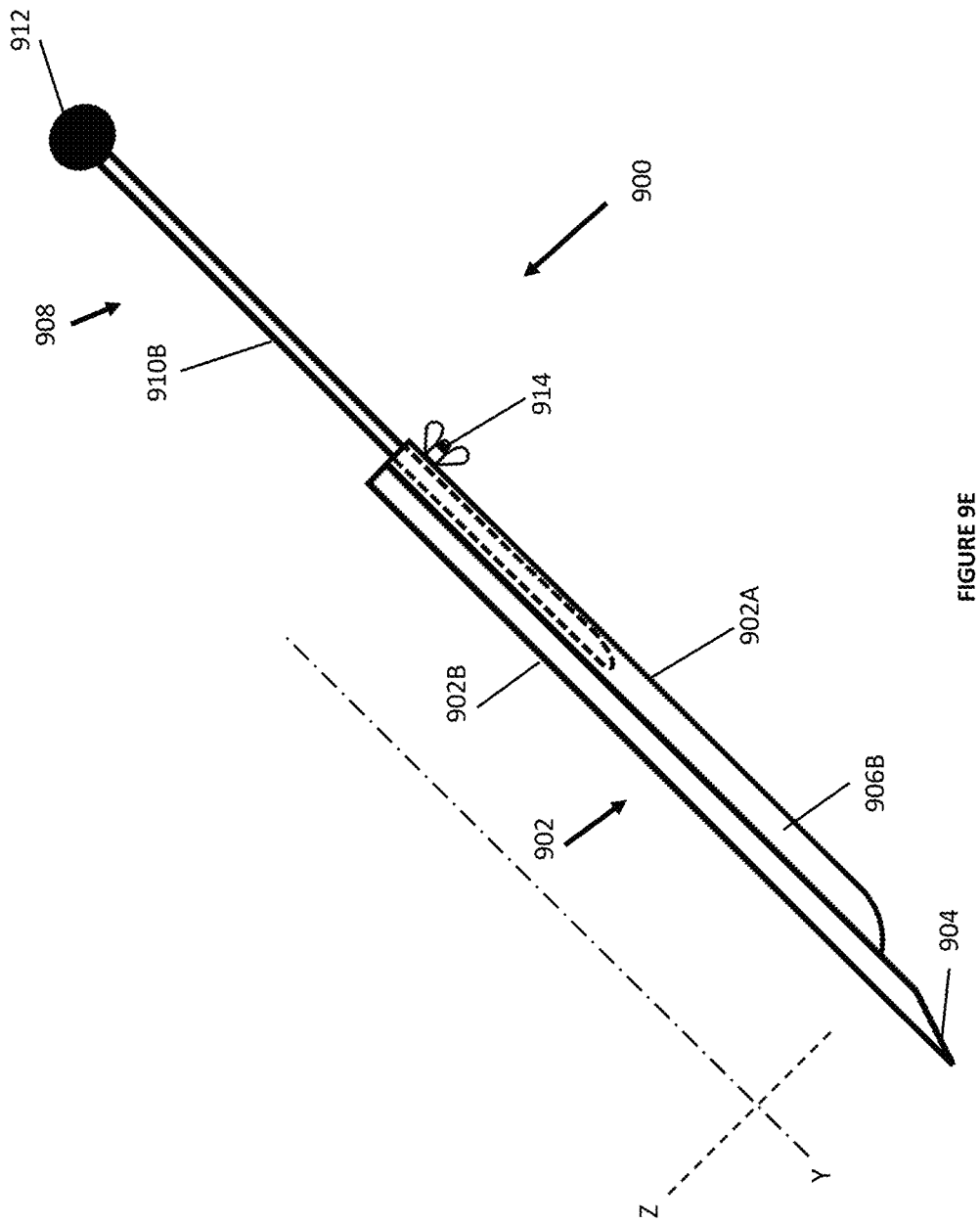
FIG. 9E is a cutaway side view of the fifth embodiment of FIG. 9A, in a partially extended position for digging.

Referring now generally to the Figures and particularly to FIG. 9A, FIG. 9A is a diagram of a back view of a fifth embodiment of the invented foldable shovel ("a fifth shovel 900") in a retracted position, having a body 902 which further comprises at least a blade 904, a first handle tube 906A, and a second handle tube 906B; and a handle 908 retractably coupled to the body 902 and further comprising at least a first handle shaft 910A, a second handle shaft 910B, and a handle grip 912. It is further noted that the present view presents a back side 902A of the body 902, and other Figures, such as FIGS. 9C and 9D, will present a front side 902B, or a side view such as in FIG. 9E wherein both the back side 902A and the front side 902B are visible. In preferred application, the fifth shovel 900 may be used for shoveling or displacing material 152 such as snow or dirt, by gripping the handle 908 and using leverage to drive the blade 904 into the material 152, such that the body 902 scoops underneath a portion of the material 152 and can be used to relocate the scooped portion of material 152. The handle 908 retracts behind the body 902 for storage or carrying, by sliding of the first handle shaft 910A and the second handle shaft 910B further into the first handle tube 906A and the second handle tube 906B respectively, or extends for use by pulling the handle grip 912 upward to extend the exposed length of both the first handle shaft 910A and the second handle shaft 910B. The position of the handle 908 relative to the body 902 may be locked or secured by any suitable means known in the art for doing so, if necessary; FIG. 9E and others present a possible securing means that may be used for this application.

Referring now generally to the Figures and particularly to FIG. 9B, FIG. 9B presents the fifth shovel 900 of FIG. 9A in an extended position. It is noted that curved dotted lines indicate the positions of the first handle shaft 910A and the second handle shaft 910B inside the first handle tube 906A and the second handle tube 906B respectively, showing how the elements of the fifth shovel 900 move to cause the fifth shovel 900 to expand and contract in length along the Y axis between the positions of FIG. 9A and FIG. 9B.

Referring now generally to the Figures and particularly to FIG. 9C, FIG. 9C presents a front view of the fifth shovel 900 of FIG. 9A in a retracted position. It is noted that the first handle tube 906A and the second handle tube 906B may in some embodiments be visible from the front of the fifth shovel 900 also.

Referring now generally to the Figures and particularly to FIG. 9D, FIG. 9D presents a front view of the fifth shovel 900 of FIG. 9A in an expanded position. It is noted that, in preferred application, the front side 902B of the fifth shovel 900 is the surface preferably used for digging and scooping when the fifth shovel 900 is deployed for use by extending of the handle 908 as presented here. Further, while the body 902 appears more or less flat in these Figures, this should not be construed as a limitation. Variation of shaping in shovel scoops and blades is already well known in the art, and it is understood that the body 902 and blade 904 may be altered and optimized in shape as preferred by a manufacturer or designer; all such variation would be considered obvious in view of the intended application as a shovel.

Referring now generally to the Figures and particularly to FIG. 9E, FIG. 9E is a side view of the fifth shovel of FIG. 9A, with the outline of the second handle shaft 910B as positioned inside the second handle tube 906B represented as a dotted line. From this angle, a fastening means 914 is also visible, for securing the position of the second handle shaft 910B relative to the second handle tube 906B. The fastening means 914 may be any suitable fastening means known in the art for application to the concern of securing the position of the handle 908 relative to the body 902, including a bolt that can be manually tightened (such as the one shown here), a spring-loaded button assembly as often implemented in tent poles or similar, or other similar fixtures as known in the art for implementation in mechanisms that telescope or retract.

Referring now generally to the Figures and particularly to FIG. 9F, FIG. 9F presents a variation or sub-embodiment of the fifth shovel 900 further including a longer body 902 and a body grip assembly 916 consisting of a first body grip aperture 918A, a second body grip aperture 918B, and a body grip point 920. The body grip assembly 916 is designed and shaped such that the user 150 may use the fifth shovel 900 in a two-handed grip, with one hand gripping the handle grip 912, and the other hand on or around the body grip point 920, with the fingers of the user 150 fitting through the first body grip aperture 918A and second body grip aperture 918B.

It is noted that the body grip assembly 916 feature may be more appropriate to include in an embodiment also including a longer body 902, such that the hand and fingers of the user 150 gripping the body grip assembly 916 are not likely to be shoved down into the material 152 along with the blade 904. At the simplest implementation, two apertures through the body 902 that the user 150 can fit their fingers through may be the minimum to produce a grippable body grip assembly 916, but elaborating upon that for improved functionality, the body grip point 920 may include padding suitable for facilitating gripping with one's hand, and may be shaped for that purpose also, such as by forming a cylindrical shape. The first body grip aperture 918A and second body grip aperture 918B may be shaped to fit one's hand, or to fit around either gloved or ungloved fingers, or may have protective material around the rims of the apertures to protect the knuckles. It is noted that FIG. 9F includes also an indication of the 'slice point' for the cross-section presented in FIG. 9G. Additionally, a body top 922 is labeled here for comparison with FIG. 9G, wherein the body top 922, i.e. the end of the apertures where the body 902 continues, is visible in the background.

Figure 9G:
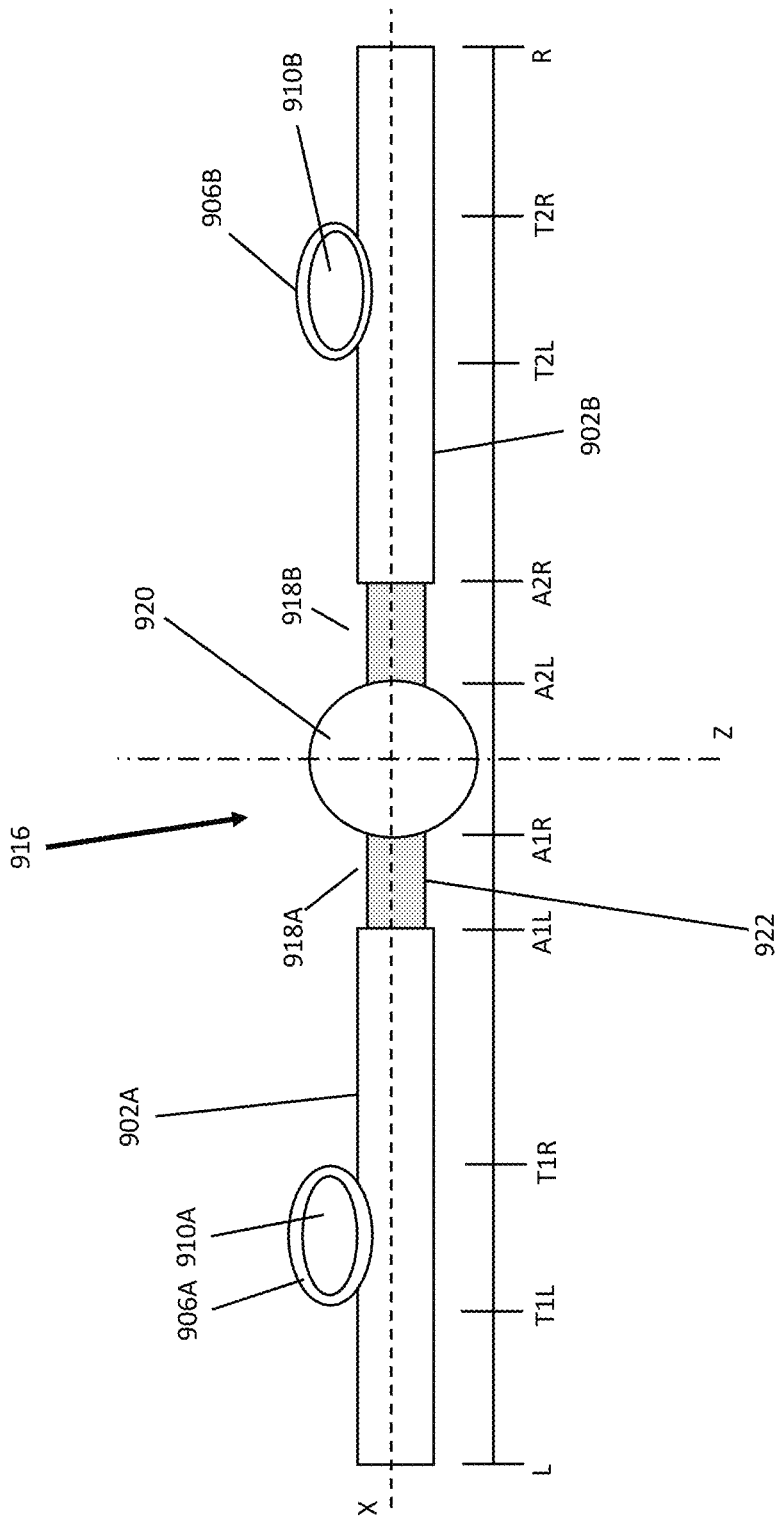
FIG. 9G is a cross-sectional view of the invented shovel of FIG. 9F.

Referring now generally to the Figures and particularly to FIG. 9G, FIG. 9G is a cross-section of the body 902 and body grip assembly 916 as presented in FIG. 9F. This is a diagram of what it might look like if the fifth shovel 900 of FIG. 9G were sheared off parallel to the X axis, at the point indicated in FIG. 9G, and one were looking straight up the handle 908, along the Y axis. Note the representation here of the body grip point 920 as having a circular cross-section, as one preferred shape for this feature, allowing for a cylindrical hand grip.

Pictured here additionally is a width measurement line presenting a plurality of relevant distances and points pertaining to the width along the X axis of the invented fifth shovel 900 and features thereof, namely a leftmost body 902 point L; first handle tube 906A sides T1L & T1R; first body grip aperture 918A sides A1L & A1R; second grip aperture 918B sides A2L & A2R; second handle tube 906B sides T2L & T2R; and a rightmost body 902 point R. The distance between L and R represents the width of the body 902, and may be anywhere in the range of from less than an inch to four feet, depending on the scaling of the fifth shovel 900. The distance between T1L & T1R is equivalent to the width measurement along the X axis of the first handle tube 906A, which may be in the range of from less than ⅛ inch to 1 foot depending on scaling of the fifth shovel 900 and the handle 908; naturally, the first handle tube 906A is sized and shaped to fit around the first handle shaft 910A. The distance between A1L and A1R represents the width measurement extending along the X-axis of the first body grip aperture 918A at a broadest point, which is preferably between less than 0.5 inch and more than 3 inches, and more preferably between 0.5 inch and 3 inches; it is noted that in intended application a hand or fingers should be able to comfortably fit into this gap to wrap around the body grip point 920. The length dimension of the first body grip aperture 918A extending along the Y-axis is preferably between less than 2 inches and more than 8 inches, and more preferably between 2 inches and 8 inches.

The distance between A2L & A2R represents the width measurement of the second body grip aperture 918B at a broadest point extending along the X-axis, which is preferably between less than 0.5 inch and more than 3 inches, and more preferably between 0.5 inch and 3 inches; it is noted that in intended application a hand or fingers should be able to comfortably fit into this gap to wrap around the body grip point 920. The length dimension of the second body grip aperture 918B extending along the Y-axis is preferably between less than 2 inches and more than 8 inches, and more preferably between 2 inches and 8 inches.

Therefore, the distance between A1R and A2L represents the width or diameter of the body grip point 920, which may be a grippable 'gap' of body 902 surface between two holes (namely the first body grip aperture 918A and the second body grip aperture 918B), but may also have a different cross-sectional shape for better gripping, such as the circular cross-section shown here. The body grip point 920 may have a width or diameter in the range of from less than ⅛ inch to 3 inches, and it is noted that the body grip point 920 is intended to be gripped by a human hand and that different sizes and shapes may fit different hands better. The distance between T2L & T2R is equivalent to the width measurement along the X axis of the second handle tube 906B, which may be in the range of from less than ⅛ inch to 1 foot depending on scaling of the fifth shovel 900 and the handle 908; naturally, the second handle tube 906B is sized and shaped to fit around the second handle shaft 910B. It is noted that in many preferred embodiments, the fifth shovel 900 is bilaterally symmetrical, such that the distance between T1L & T1R is equivalent to the distance between T2L & T2R and the distance between A1L & A1R is equivalent to the distance between A2L & A2R, but this should not be construed as a limitation except as limited by the claims. Additionally, in this image the first handle tube 906A and the second handle tube 906B are represented as positioned on the back side 902A of the body 902, and not forming any indentation or contour visible from the front side 902B; it is noted that this is not intended to suggest a limitation, and in preferred embodiments the first handle tube 906A and the second handle tube 906B may be set further into the body 902 or the material of the body may be thinner and molded around the first handle tube 906A and the second handle tube 906B. It is noted that the elements of the fifth shovel may vary in size, and the fifth shovel 900 is broadly scalable; a garden trowel sized embodiment is possible, wherein the body 902 is three inches long or so, and so is a 'turtle shell' embodiment, wherein the body 902 is large enough to cover (and even protect) one's whole back and shoulders when carried, and when deployed may be the size of a broad-scooped snow shovel.

Figure 9H:
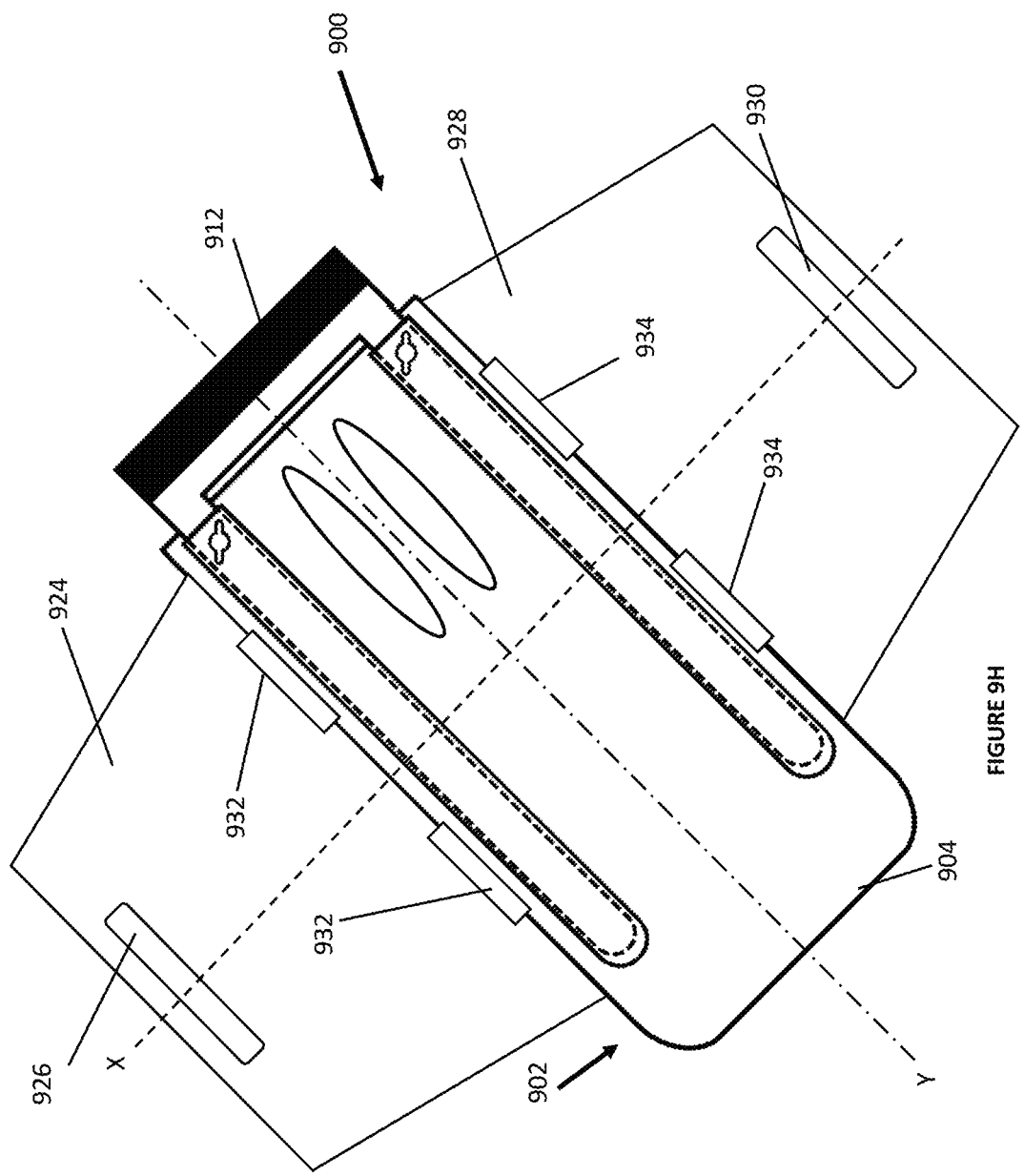
FIG. 9H is a back view of the invented shovel of FIG. 9F, with the further preferred feature of side panels included in an extended position.

Referring now generally to the Figures and particularly to FIG. 9H, FIG. 9H is a back view of the invented shovel of FIG. 9F, with the further preferred feature of side panels included in an extended position, specifically a fifth left panel 924 having a fifth left panel handle aperture 926 and a fifth right panel 928 having a fifth right handle aperture 930. The fifth left panel 924 is rotatably coupled to the left edge of the fifth body 902 by means of one or more fifth left hinge assemblies 932 or similar, and fifth right panel 928 is rotatably coupled to the right edge of the fifth body 902 by means of one or more fifth left hinge assemblies 934 or similar. It is noted that further equipping the fifth shovel 900 with these additional features allows for greater versatility in how the fifth shovel 900 is deployed and used, allowing for practicing the scooping method of FIG. 1E as an alternative to the method of a conventional handled shovel, or even a combination of these that may suit the user 150. It is further noted that in some embodiments the fifth left panel 924 and the fifth right panel 928 may be detachable, or differently-shaped such as narrower, longer, or shorter.

Figure 9I:
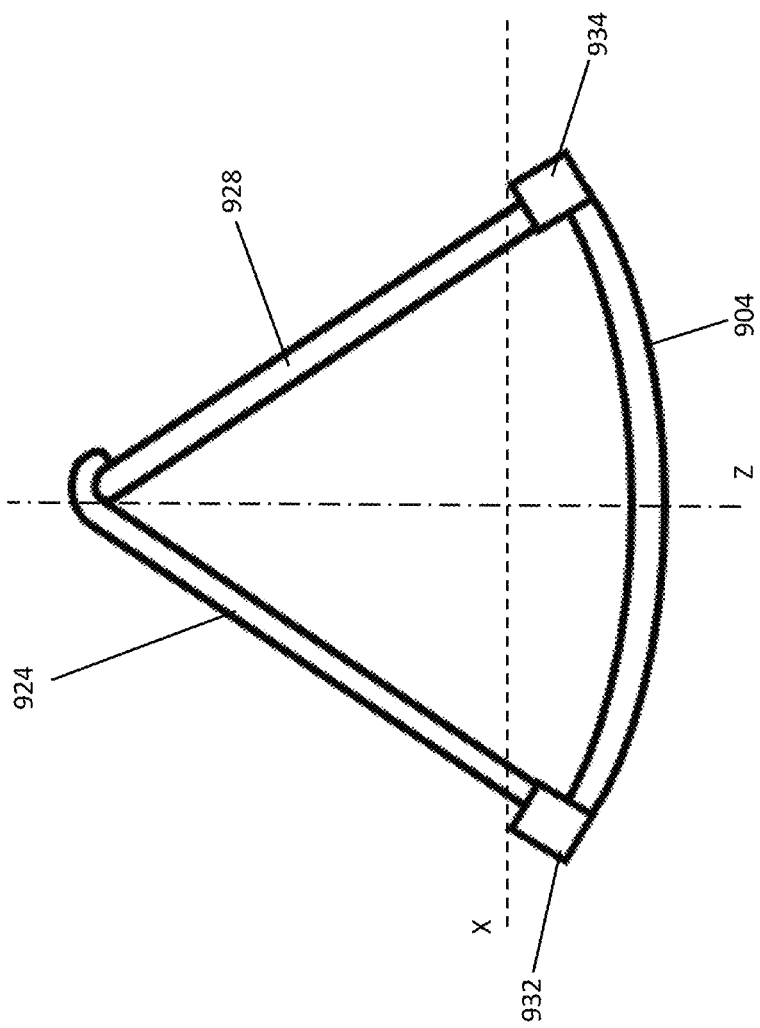
FIG. 9I is a view of the invented shovel of FIG. 9H with the side panels in a deployed position.

Referring now generally to the Figures and particularly to FIG. 9I, FIG. 9I is a view of the invented shovel of FIG. 9H with the side panels in a deployed position, such that the fifth left panel 924 and the fifth right panel 928 can be held together in one hand and the fifth shovel 900 used as presented in FIG. 1E.

Referring now generally to the Figures and particularly to FIG. 9J, FIG. 9J is a front view of the invented shovel of FIG. 9H with the fifth left panel 924 and the fifth right panel 928 in a folded position for storage or carrying.

Figure 10:
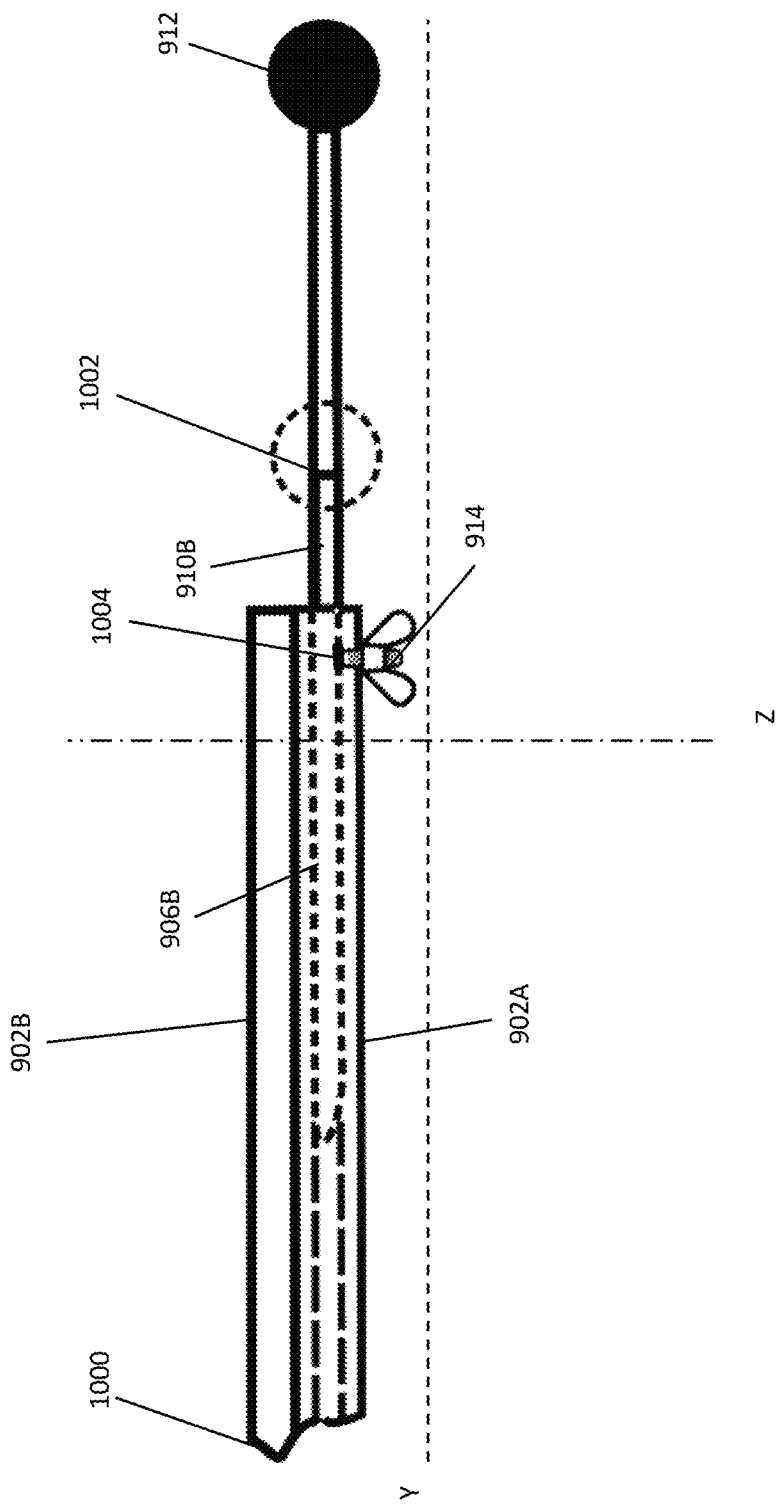
FIG. 10 is a cutaway side view of the fifth embodiment of FIG. 9A, presenting mechanical elements relevant to retraction and extension of the handle.

Referring now generally to the Figures and particularly to FIG. 10, FIG. 10 is a closer image of the fifth shovel 900 of FIGS. 9A through 9G presenting some retraction mechanics in further detail. It is noted that FIG. 10 only presents a partial view of the fifth shovel 900, and a jagged line 100 indicates a 'cutoff' point beyond which the rest of the shovel body 902 can be imagined to continue as presented in prior Figures. FIG. 10 presents a further available feature for use in causing the fifth shovel 900 handle 908 to retract, namely a telescoping point 1002 indicating where one section of the handle 908 may slide inside an adjacent section, as with a travel umbrella or similar; this may have the drawback of weakening the handle 908, as this might require a portion of the handle 908 to be hollow; in certain embodiments and applications, though, that may not be a concern. Additionally, the fastening means 914 is presented again here, and also shown is a fastening point 1004, such as an aperture in the second handle tube 906B as shown, allowing the fastening means 914 to halt or impede movement of the second handle shaft 910B when tightened by turning or tightening of the fastening means 914.

It is noted that, while some embodiments of the invented shovel are ideally suited as lightweight avalanche rescue tools, the fifth shovel 900 is, or can be, a heavier-duty tool, such as might be packed along on a military expedition for any shoveling needs. It is noted that many prior art foldable shovels share the flaw of being hazardous to carry as designed, because if the carrier trips or falls, they could land on the blade or handle of the shovel and get seriously injured, such as by the shovel blade digging into one's vertebrae. The design of the present invention is specifically directed toward design of portable shovels that are safer to fall down with while carrying. Further, in a military expedition, a shovel is generally too useful a tool to leave behind, but the person carrying the shovel could alternatively be carrying more armor or other gear instead; there's a trade-off in what gear the soldier is able to carry along. However, what if one's portable shovel doubled also as an additional back-plate or shield, and a soldier didn't have to sacrifice carrying armor for carrying the shovel? An embodiment of the fifth shovel 900 wherein the body 902 is sized and shaped to fit over most of the back and shoulders of the user 150 when carried, and made of an appropriately armorlike material, would be well suited to such an application, hence the inventor's nickname of 'turtle shell' for such an embodiment.

Figure 11:
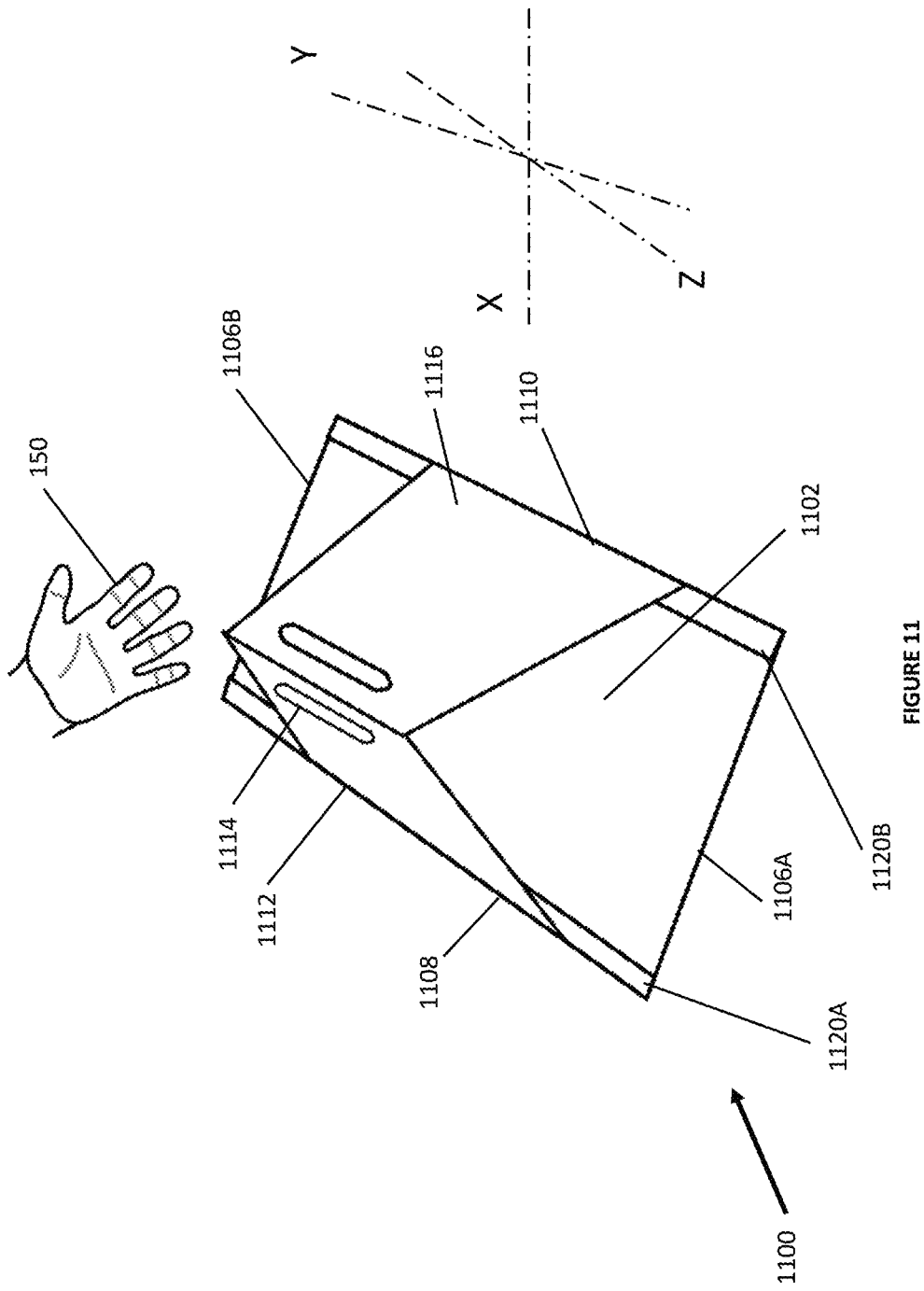
FIG. 11 is a perspective view of a sixth embodiment of the invented shovel in a deployed mode configured for shoveling or displacing materials.

Referring now generally to the Figures, and particularly to FIG. 11, FIG. 11 is a perspective view of a sixth embodiment of the invented foldable shovel ("a sixth shovel 1100") in a deployed mode configured for shoveling or displacing materials. The sixth shovel 1100 additionally includes a sixth center panel 1102 having a sixth blade front 1106A and a sixth blade back 1106B, a second left vertex 1108, a second right vertex 1110, a sixth left panel 1112 including at least a sixth left handle aperture 1114; and a sixth right panel 1116 including at least a sixth right handle aperture 1118 (not visible). In preferred application, the user 150 may fold the sixth left panel 1112 and sixth right panel 1116 upward from a flat position and inward, to form a triangular shape with the sixth center panel 1102 as the base and the sixth left handle aperture 1114 and sixth right handle aperture 1118 proximal to each other at the apex of the triangular shape, as presented at least in FIGS. 1B and 2B pertaining to other embodiments. The user 150 would preferably grip the sixth left handle aperture 1114 and the sixth right handle aperture 1118 together in the same hand, such that the user 150 can use the sixth shovel 1100 as a one-handed scooping tool. To facilitate this and similar applications, the sixth blade 1106 may optionally be sharp or tapered. FIG. 11 demonstrates the way in which a human hand may press the left handle and the right handle together over the center axis of the blade for the purpose of creating a load-bearing grip. The sixth shovel 1100 further presents an embodiment including no back handle aperture, unlike at least the first shovel which included the first back handle aperture 104; instead, the sixth shovel 1100 may be viewed as being able to shovel in either direction, 'fronthand' or 'backhand', equally well, and what was the 'back' in other embodiments may be viewed as just another shovel blade. Further, certain preferred embodiments, such as the sixth shovel 1100 presented here, may further include the feature of side walls 1120A & 1120B on the sixth center panel 1100, such that the sixth center panel 1102 forms that much more of a 'scoop'.

Figure 12:
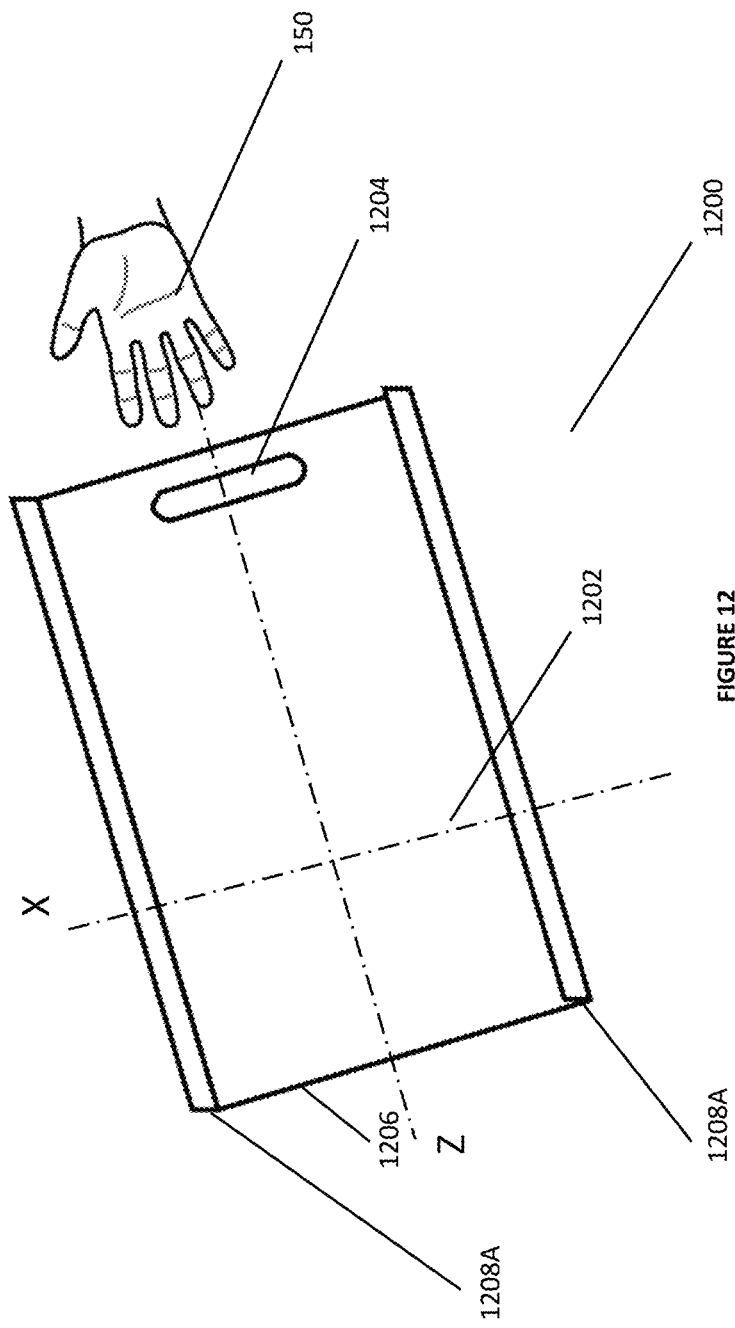
FIG. 12 is a perspective view of an alternate method of the invented foldable shovel, wherein the digging blade is deployed independent of the handle sheets.

Referring now generally to the Figures, and particularly to FIG. 12, FIG. 12 is a perspective drawing of an alternate method of deployment for the invented collapsible shovel, presented as a seventh embodiment of the invented foldable shovel ("a seventh shovel 1200"). The seventh shovel 1200 may include or comprise a seventh center panel 1202, a seventh back handle aperture 1204, a seventh blade 1206, and a pair of second side walls 1208A & 1208B. FIG. 12 presents the user 150 grasping the seventh back handle aperture 1204 of the seventh shovel 1200 for the purpose of utilizing the seventh blade 1206 without use of a left panel or right panel. This may be an embodiment of the invented shovel in itself, or a method for utilizing a portion of an embodiment of the invented shovel, such as the first center panel 102 of the first shovel 100, the second center panel 202 of the second shovel 200, or similar, as itself a simpler shovel.

Referring now generally to the Figures, and particularly to FIGS. 13A through 13C, FIGS. 13A through 13C present an eighth embodiment of the invented foldable shovel ("an eighth shovel 1300") comprising an eighth center panel 1302, an eighth left panel 1304, and an eighth right panel 1306 with edges shaped to hook together when pulled laterally outward and form a triangular shovel apparatus similar to the first shovel 100, the second shovel 200, and similar when an eighth left handle aperture 1308 and a right handle aperture 1310 are gripped together. The eighth shovel further may comprise an eighth back handle aperture 1312 and an eighth blade 1314. Additionally, the eighth shovel may include an eighth center panel left edge 1316 and an eighth center panel right edge 1318, wherein the eighth center panel left edge 1316 and the eighth center panel right edge 1318 curve or corner upward, forming side walls for the eighth center panel 1302 into which elements of the left panel 1304 and/or the right panel 1306 may also hook in to secure the center left panel 1304 and/or the center right panel 1306 to either side of the eighth center panel 1302. Also presented are an eighth left panel hooking assembly 1320 which may consist at least of an eighth left panel hooking aperture 1320A and an eighth left panel hooking element 1320B, and an eighth right panel hooking assembly 1322 which may consist at least of an eighth right panel hooking aperture 1322A and an eighth right panel hooking element 1322B.

Referring now generally to the Figures, and particularly to FIG. 13A, FIG. 13A is a perspective view of the eighth shovel 1300 in a partially deployed position. The eighth left panel 1304 displays the deployed position described in FIG. 13C. The eighth right panel 1306 displays the undeployed position described in FIG. 13B. FIG. 13A demonstrates the manner in which the eighth left panel 1304 and/or the eighth right panel 1306 may be deployed independent of one another. It is noted that the eighth right panel 1306 is here presented disengaged and flat, parallel to the X axis, and the eight left panel 1304 is here presented engaged and forming a corner such that the eight left panel 1304 is orthogonal to the eighth center panel 1302 and parallel to the Y axis.

Referring now generally to the Figures, and particularly to FIG. 13B, FIG. 13B shows a close-up cross-section view of a rotational coupling of the eighth right panel hooking assembly 1322, forming a junction between the eighth center panel 1302 and the eighth right panel 1306 that can be unhooked for portability or hooked together to provide a corner of the eighth shovel 1300 structure as outlined above. Everything stated and shown herein regarding the operation of the eighth right panel hooking assembly 1322 should be understood to apply equally to the eighth left panel hooking assembly 1320. In FIG. 13B, the eighth right panel hooking assembly 1322 is dislodged, such that the eighth center panel 1302 and the eighth right panel 1306 remain connected but can shift independently of each other. The eighth right panel 1306 can slide through the eighth right panel hooking aperture 1322A and rest parallel to the eighth center panel 1302, such as for storage.

Referring now generally to the Figures, and particularly to FIG. 13C, FIG. 13C shows the close-up cross-section view of FIG. 13B, now in an engaged position. Everything stated and shown herein regarding the operation of the eighth right panel hooking assembly 1322 as implemented in coupling the eighth right panel 1306 to the right side of the eighth center panel 1302 should be understood to apply equally to the eighth left panel hooking assembly 1320 as implemented in coupling the eighth left panel 1304 to the left side of the eighth center panel 1302. In FIG. 13C, the eighth right panel hooking assembly 1322 is engaged, such that the eighth center panel 1302 and the eighth right panel 1306 are interlocked, forming a solid corner, and can be moved as a unit. With both the eighth left panel hooking assembly 1320 and the eighth right panel hooking assembly 1322 engaged, the eighth left handle aperture 1308 and the eighth right handle aperture 1310 can be gripped together in a single hand, as presented in other Figures and embodiments such as particularly FIG. 1E, to assemble a triangular shovel device suitable for scooping material 152 such as mud, dirt, or snow.

Referring now generally to the Figures and particularly to FIG. 14A, FIG. 14A is a diagram of a back view of a ninth embodiment of the invented foldable shovel ("a ninth shovel 1400") in a retracted position, having a ninth body 1402 which further comprises at least a ninth blade 1404, a ninth handle tube 1406; and a ninth handle 1408 retractably coupled to the ninth body 1402 and further comprising at least a ninth handle shaft 1410, and a ninth handle grip 1412. It is further noted that the present view presents a ninth back side 1402A of the ninth body 1402, and other Figures, such as FIGS. 14C and 14D, will present a ninth front side 1402B, or a side view such as in FIG. 14E wherein both the ninth back side 1402A and the ninth front side 1402B are visible. In preferred application, the ninth shovel 1400 may be used for shoveling or displacing material 152 such as snow or dirt, by gripping the ninth handle 1408 and using leverage to drive the ninth blade 1404 into the material 152, such that the ninth body 1402 scoops underneath a portion of the material 152 and can be used to lift the scooped portion of material 152. The ninth handle 1408 retracts behind the ninth body 1402 for storage or carrying, by sliding of the ninth handle shaft 1410 further into the ninth handle tube 1406, or extends for use by pulling the ninth handle grip 1412 upward to extend the exposed length of the ninth handle shaft 1410. The position of the ninth handle 1408 relative to the ninth body 1402 may be locked or secured by any suitable means known in the art for doing so, if necessary; FIG. 14E and others present a possible securing means that may be used for this application.

Referring now generally to the Figures and particularly to FIG. 14B, FIG. 14B presents the ninth shovel 1400 of FIG. 14A in an extended position. It is noted that curved dotted lines indicate the position of the ninth handle shaft 1410 inside the ninth handle tube 1406, showing how the elements of the ninth shovel 1400 move to cause the ninth shovel 1400 to extend and retract in length along the Y axis between the positions of FIG. 14A and FIG. 14B.

Referring now generally to the Figures and particularly to FIG. 14C, FIG. 14C presents a front view of the ninth shovel 1400 of FIG. 14A in a retracted position. It is noted that the ninth handle tube 1406 may in some embodiments be visible from the ninth front side 1402B of the ninth shovel 1400 also.

Referring now generally to the Figures and particularly to FIG. 14D, FIG. 14D presents a front view of the ninth shovel 1400 of FIG. 14A in an expanded position. It is noted that, in preferred application, the front side 1402B of the ninth shovel 1400 is the surface preferably used for digging and scooping when the ninth shovel 1400 is deployed for use by extending of the ninth handle 1408 as presented here. Further, while the ninth body 1402 appears more or less flat in these Figures, this should not be construed as a limitation. Variation of shaping in shovel scoops and blades is already well known in the art, and it is understood that the ninth body 1402 and blade 1404 may be altered and optimized in shape as preferred by a manufacturer or designer; all such variation would be considered obvious in view of the intended application as a shovel.

Referring now generally to the Figures and particularly to FIG. 14E, FIG. 14E is a side view of the ninth shovel 1400 of FIG. 14A, with the outline of the ninth handle shaft 1410 as positioned inside the ninth handle tube 1406 represented as a dotted line. From this angle, a ninth fastening means 1414 is also visible, for securing the position of the ninth handle shaft 1410 relative to the ninth handle tube 1406. The ninth fastening means 1414 may be any suitable fastening means known in the art for application to the concern of securing the position of the ninth handle 1408 relative to the ninth body 1402, including a bolt that can be manually tightened (such as the one shown here), a spring-loaded button assembly as often implemented in tent poles or similar, or other similar fixtures as known in the art for implementation in mechanisms that telescope or retract.

Figure 14F:
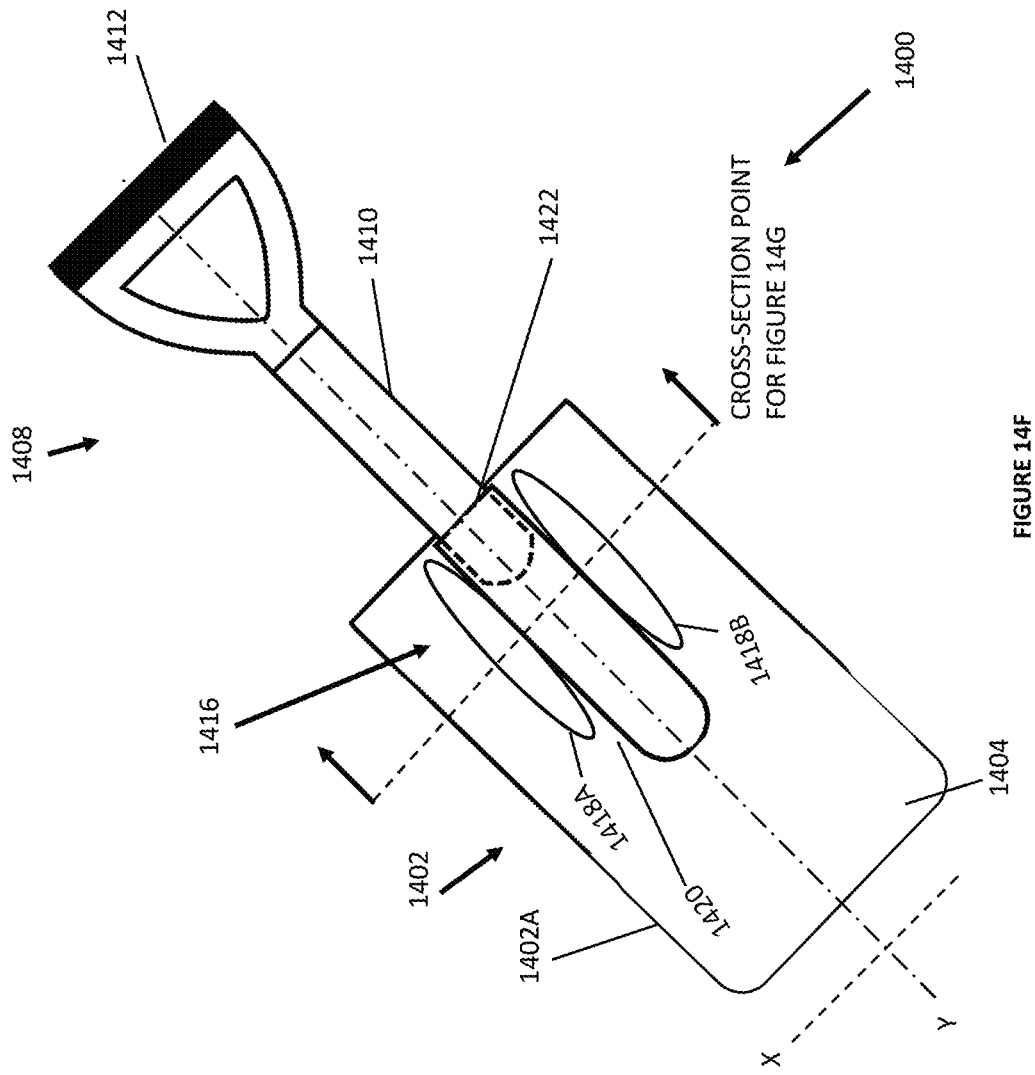
FIG. 14F is a cutaway back view of the ninth embodiment of FIG. 14A, in a retracted position, and having additional preferred features including a longer body and a body grip assembly.

Referring now generally to the Figures and particularly to FIG. 14F, FIG. 14F presents a variation or sub-embodiment of the ninth shovel 1400 further including a longer ninth body 1402 and a ninth body grip assembly 1416 consisting of a ninth first body grip aperture 1418A, a ninth second body grip aperture 1418B, and a ninth body grip point 1420. The ninth body grip assembly 1416 is designed and shaped such that the user 150 may use the ninth shovel 1400 in a two-handed grip, with one hand gripping the ninth handle grip 1412, and the other hand on or around the ninth body grip point 1420, with the fingers of the user 150 fitting through the ninth first body grip aperture 1418A and ninth second body grip aperture 1418B.

It is noted that the ninth body grip assembly 1416 feature may be more appropriate to include in an embodiment also including a longer ninth body 1402, such that the hand and fingers of the user 150 gripping the ninth body grip assembly 1416 are not likely to be shoved down into the material 152 along with the ninth blade 1404. At the simplest implementation, two apertures (namely, the ninth first body grip aperture 1418A and the ninth second body grip aperture 1418B) through the ninth body 1402 that the user 150 can fit their fingers through may be the minimum to produce a grippable ninth body grip assembly 1416, but elaborating upon that for improved functionality, the ninth body grip point 1420 may further include padding suitable for facilitating gripping with one's hand, and may be shaped for that purpose also, such as by forming a cylindrical shape. The ninth first body grip aperture 1418A and ninth second body grip aperture 1418B may be shaped to fit one's hand, or to fit around either gloved or ungloved fingers, or may have protective material around the rims of the apertures to protect the knuckles. It is noted that FIG. 14F includes also an indication of the 'slice point' for the cross-section presented in FIG. 14G. Additionally, a ninth body top 1422 is labeled here for reference with FIG. 14G, wherein the ninth body top 1422, i.e. the upper end of the apertures where the ninth body 1402 continues, is visible in the background.

Figure 14H:
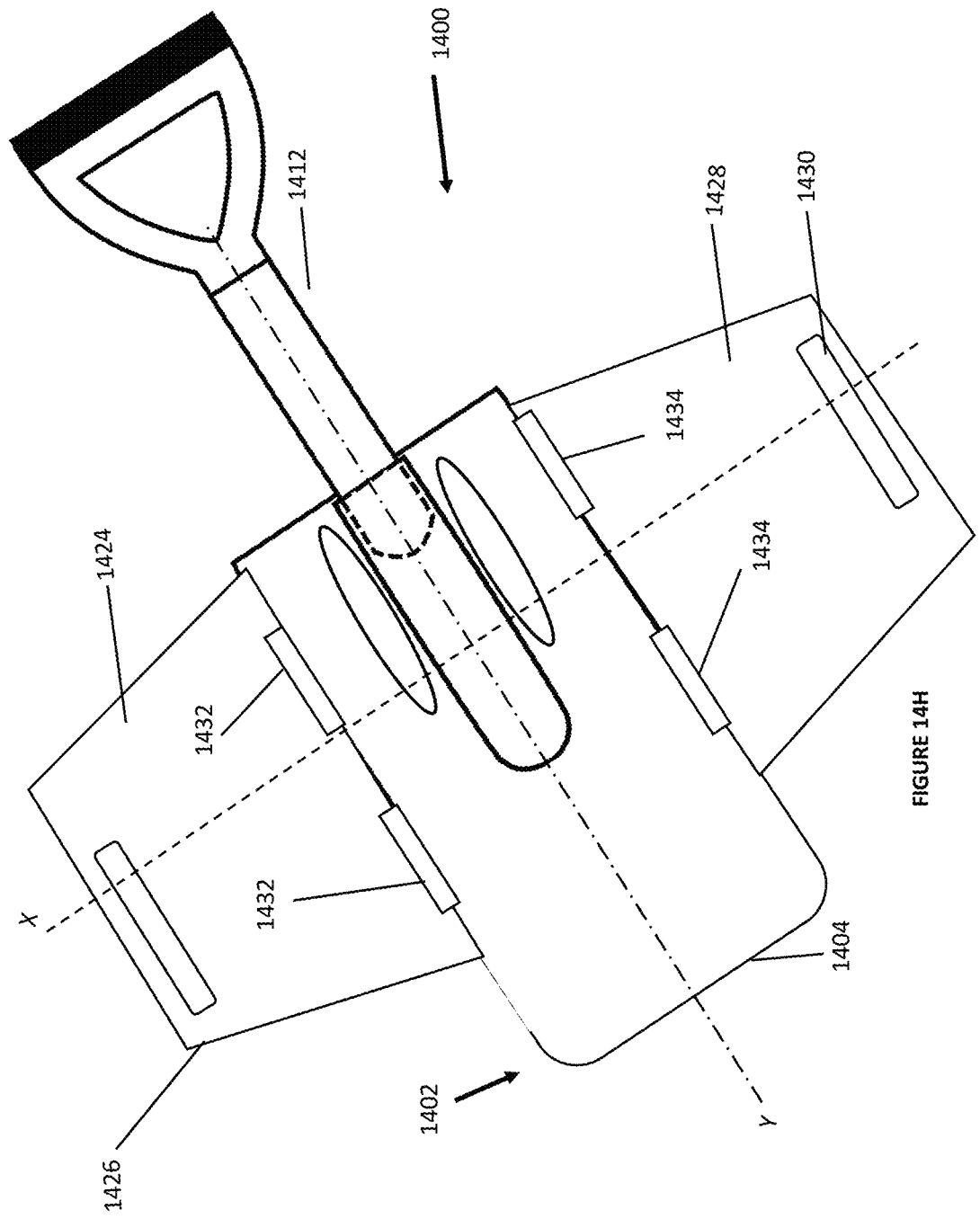
FIG. 14H is a back view of the invented shovel of FIG. 14F, with the further preferred feature of side panels included in an extended position.
Figure 14I:
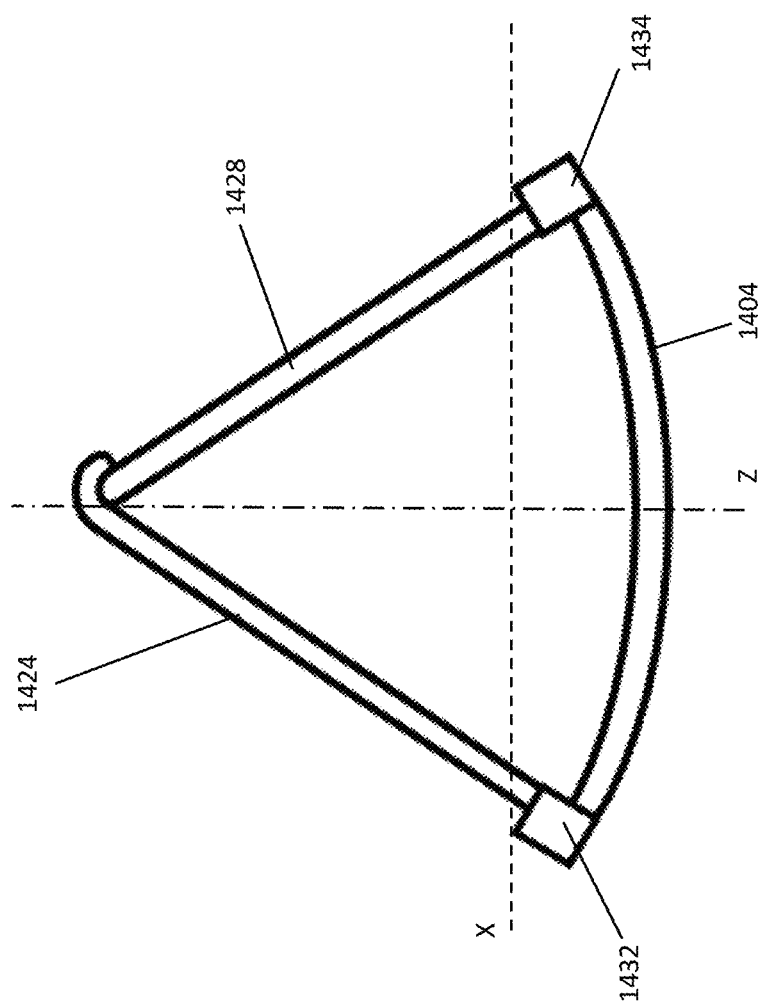
FIG. 14I is a view of the invented shovel of FIG. 14H with the side panels in a deployed position.
Figure 14J:
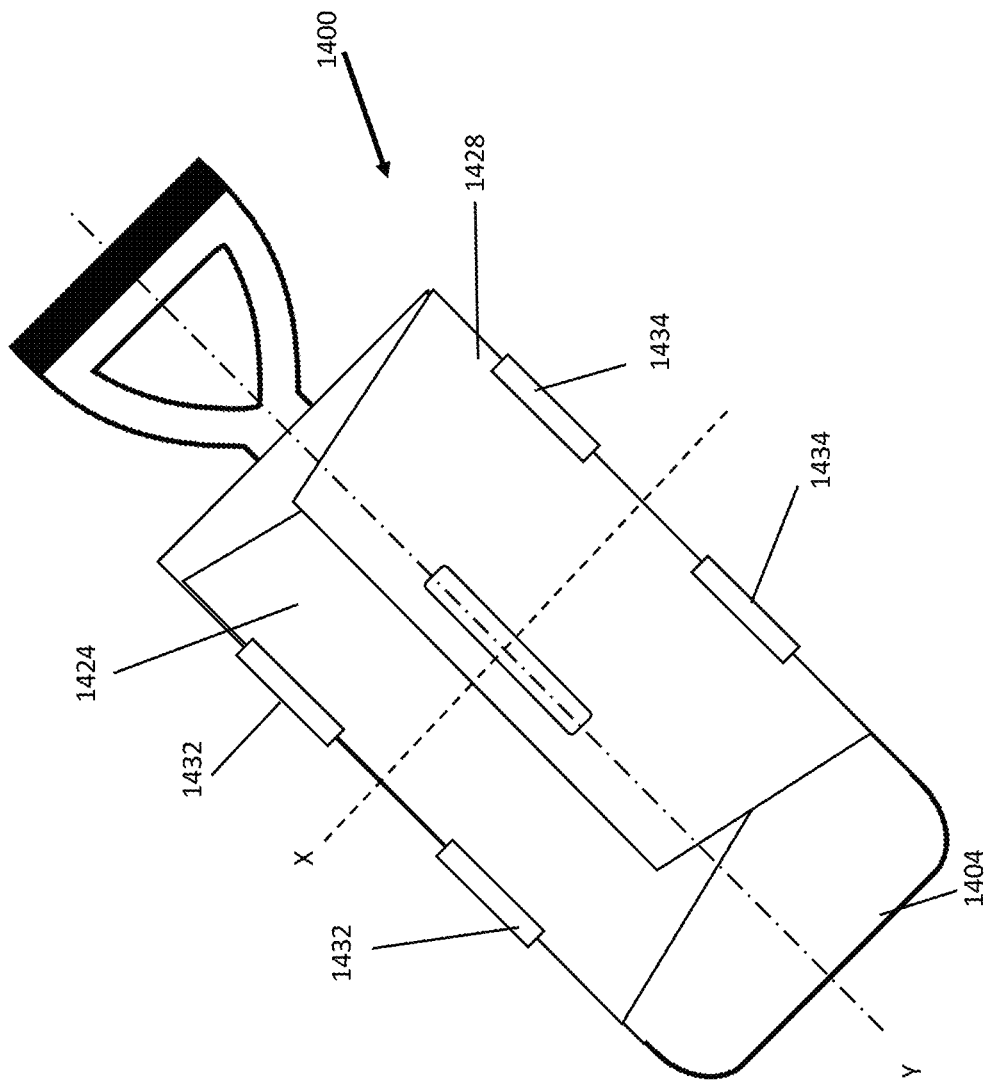
FIG. 14J is a view of the invented shovel of FIG. 14H with the side panels in a folded position.
Figure 14G:
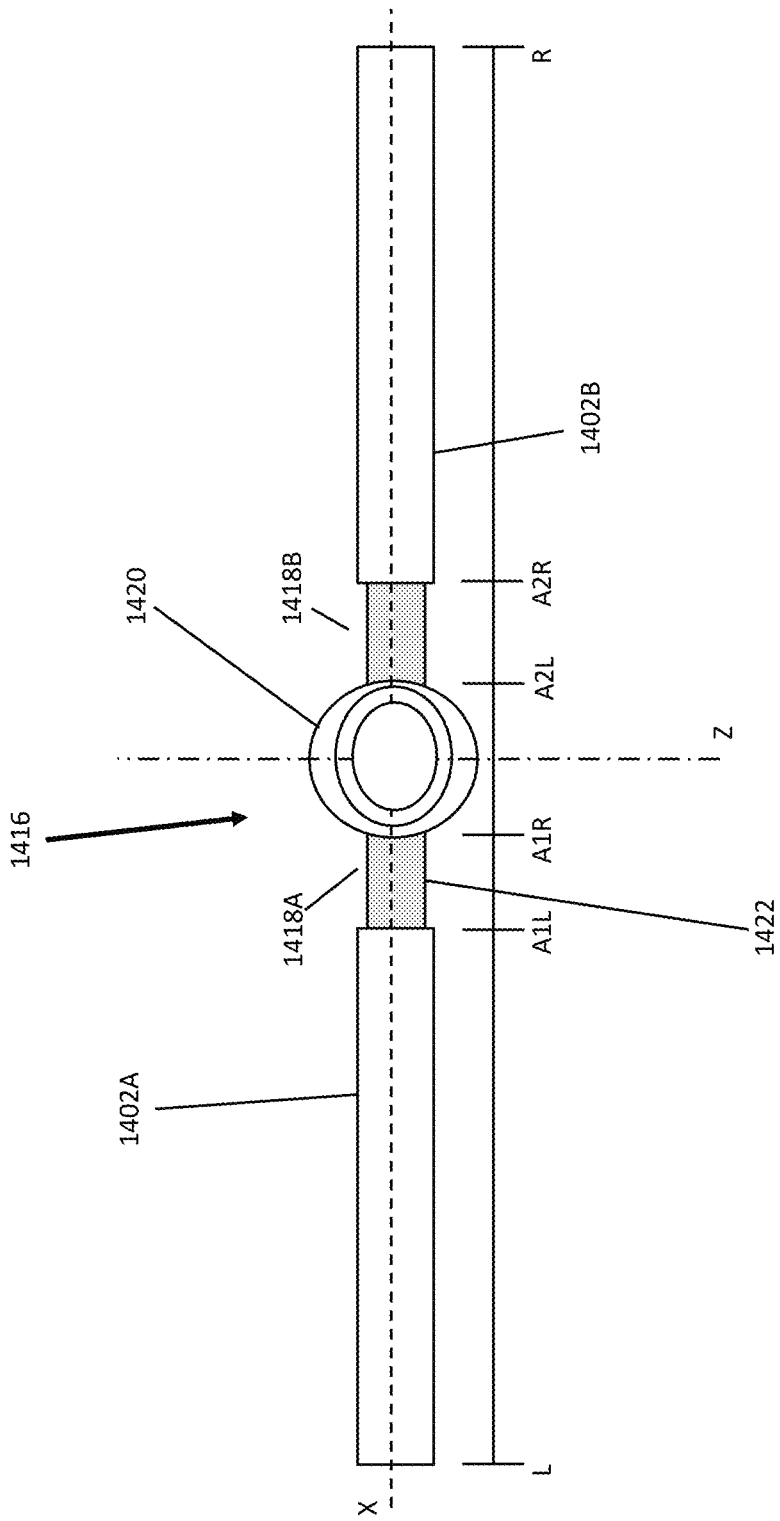
FIG. 14G is a cross-sectional view of the invented shovel of FIG. 14F.

Referring now generally to the Figures and particularly to FIG. 14G, FIG. 14G is a cross-section of the ninth body 1402 and ninth body grip assembly 1416 as presented in FIG. 14F. This is a diagram of what it might look like if the ninth shovel 1400 of FIG. 14G were sheared off parallel to the X axis, at the point indicated in FIG. 14G, and one were looking straight up toward the ninth handle 1408, along the Y axis. Note the representation here of the ninth body grip point 1420 as having a circular cross-section, as one preferred shape for this feature, allowing for a cylindrical hand grip.

Pictured here additionally is a width measurement line presenting a plurality of relevant distances and points pertaining to the width along the X axis of the invented ninth shovel 1400 and features thereof, namely a leftmost ninth body 1402 point L; first body grip aperture 1418A sides A1L & A1R; second grip aperture 1418B sides A2L & A2R; and a rightmost body 1402 point R. The distance between L and R represents the width of the ninth body 1402, and may be anywhere in the range of from less than an inch to four feet, depending on the scaling of the ninth shovel 1400. The distance between A1L and A1R represents the width measurement along the X-axis of the first body grip aperture 1418A at a broadest point, which is preferably between less than 0.5 inch and more than 3 inches, and more preferably between 0.5 inches and 3 inches; it is noted that in intended application a hand or fingers should be able to comfortably fit into this gap to wrap around the body grip point 1420. The distance between A2L & A2R represents the width measurement along the X-axis of the second body grip aperture 1418B at a broadest point, which is preferably between less than 0.5 inch and more than 3 inches, and more preferably between 0.5 and 3 inches; the length dimension of the second body grip aperture 1418B along the Y-axis preferably extends between 2 inch and 8 inches, and more preferably between 2 and 8 inches.

It is noted that in intended application a hand or fingers should be able to comfortably fit into this gap to wrap around the body grip point 1420. Therefore, the distance between A1R and A2L represents the width or diameter of the body grip point 1420, which may be a grippable 'gap' of body 1402 surface between two holes (namely the first body grip aperture 1418A and the second body grip aperture 1418B), but may also have a different cross-sectional shape for better gripping, such as the circular cross-section shown here. The body grip point 1420 may have a width or diameter along the X-axis in the range of from less than ⅛ inch to more than 3 inches, and it is noted that the body grip point 1420 is intended to be gripped by a human hand and that different sizes and shapes may fit different hands better. It is noted that in many preferred embodiments, the ninth shovel 1400 is bilaterally symmetrical, such that the distance between A1L & A1R is equivalent to the distance between A2L & A2R, but this should not be construed as a limitation except as limited by the claims. It is noted that, unlike the fifth shovel 900, this embodiment includes only the single handle tube 1406 positioned approximately along the center line of the ninth shovel 1400, and the handle tube 1406 could be fitted inside of or directly behind the ninth body grip point 1420, as shown here. It is noted that the elements of the ninth shovel 1400 may vary in size, and the ninth shovel 1400 is broadly scalable; a garden trowel sized embodiment is possible, wherein the ninth body 1402 is three inches long or so, and so is a 'turtle shell' embodiment, wherein the ninth body 1402 is large enough to cover (and even protect) one's whole back and shoulders when carried, and when deployed may be the size of a broad-scooped snow shovel.

Referring now generally to the Figures and particularly to FIG. 14H, FIG. 14H is a back view of the invented shovel of FIG. 14F, with the further preferred feature of side panels included in an extended position, specifically a ninth left panel 1424 having a ninth left panel handle aperture 1426 and a ninth right panel 1428 having a ninth right handle aperture 1430. The ninth left panel 1424 is rotatably coupled to the left edge of the ninth body 1402 by means of one or more ninth left hinge assemblies 1432 or similar, and ninth right panel 1428 is rotatably coupled to the right edge of the ninth body 1402 by means of one or more ninth left hinge assemblies 1434 or similar. It is noted that further equipping the ninth shovel 1400 with these additional features allows for greater versatility in how the ninth shovel 1400 is deployed and used, allowing for practicing the scooping method of FIG. 1E as an alternative to the method of a conventional handled shovel, or even a combination of these that may suit the user 150. It is further noted that in some embodiments the ninth left panel 1424 and the ninth right panel 1428 may be detachable, or differently-shaped such as narrower, longer, or shorter.

Referring now generally to the Figures and particularly to FIG. 14I, FIG. 14I is a view of the invented shovel of FIG. 14H with the side panels in a deployed position, such that the ninth left panel 1424 and the ninth right panel 1428 can be held together in one hand and the ninth shovel 1400 used as presented in FIG. 1E.

Referring now generally to the Figures and particularly to FIG. 14J, FIG. 14J is a front view of the invented shovel of FIG. 14H with the ninth left panel 1424 and the ninth right panel 1428 in a folded position for storage or carrying.

Figure 15:
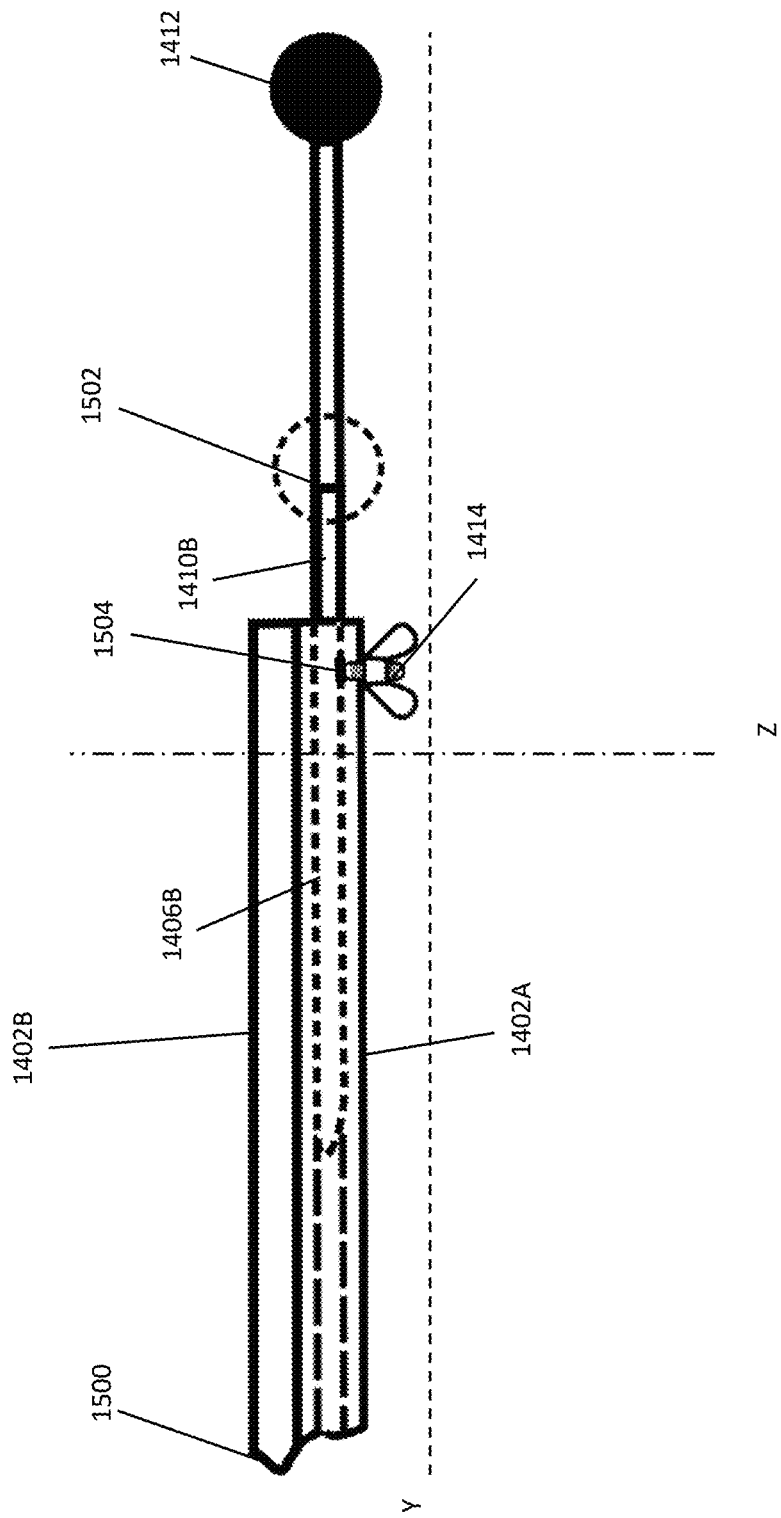
FIG. 15 is a cutaway side view of the ninth embodiment of FIG. 14A, presenting mechanical elements relevant to retraction and extension of the handle.

Referring now generally to the Figures and particularly to FIG. 15, FIG. 15 is a closer image of the ninth shovel 1400 of FIGS. 14A through 14J presenting some retraction mechanics in further detail. It is noted that FIG. 15 only presents a partial view of the ninth shovel 1400, and a jagged line 1500 [100] indicates a 'cutoff' point beyond which the rest of the shovel body 1402 can be imagined to continue as presented in prior Figures. FIG. 15 presents a further available feature for use in causing the ninth shovel 1400 handle 1408 to retract, namely a telescoping point 1502 indicating where one section of the ninth handle 1408 may slide inside an adjacent section, as with a travel umbrella or similar; this may have the drawback of weakening the ninth handle 1408, as this might require a portion of the ninth handle 1408 to be hollow; in certain embodiments and applications, though, that may not be a concern. Additionally, the fastening means 1414 is presented again here, and also shown is a fastening point 1504, such as an aperture in the ninth handle tube 1406 as shown, allowing the fastening means 1414 to halt or impede movement of the ninth handle shaft 1410 when tightened by turning or tightening of the fastening means 1414.

It is noted that, while some embodiments of the invented shovel are ideally suited as lightweight avalanche rescue tools, the ninth shovel 1400 is, or can be, a heavier-duty tool, such as might be packed along on a military expedition for any shoveling needs. It is noted that many prior art foldable shovels share the flaw of being hazardous to carry as designed, because if the carrier trips or falls, they could land on the blade or handle of the shovel and get seriously injured, such as by the shovel blade digging into one's vertebrae. The design of the present invention is specifically directed toward design of portable shovels that are safer to fall down with while carrying. Further, in a military expedition, a shovel is generally too useful a tool to leave behind, but the person carrying the shovel could alternatively be carrying more armor or other gear instead; there's a trade-off in what gear the soldier is able to carry along. However, what if one's portable shovel doubled also as an additional back-plate or shield, and a soldier didn't have to sacrifice carrying armor for carrying the shovel? An embodiment of the ninth shovel 1400 wherein the ninth body 1402 is sized and shaped to fit over most of the back and shoulders of the user 150 when carried, and made of an appropriately armor-like material, would be well suited to such an application, hence the inventor's nickname of 'turtle shell' for such an embodiment.

One skilled in the art will recognize that any measurements or ratios given herein are strictly in the interest of facilitating ease of optimal implementation of the invention, as the preferred measurements or ratios as already understood, and will recognize also that the invention may be scalable in size or proportions in various additional obvious embodiments of the invention described herein.

Additionally, one skilled in the art will recognize that one or more of the alternate preferred embodiments the present invention may comprise or be constructed out of any one or more of several suitable materials known in the art, including but not limited to and non-exclusively, polycarbonate, plastic, metal, wood, Kevlar, and ceramics, in singularity or in combination. The materials used to construct the invention all offer various tradeoffs in durability, lightness of weight, sharpness of the shovel blade, and other qualitative factors, with some materials preferable to others as mentioned herein or obvious to someone skilled in the art of manufacturing like devices. Any device matching the description and specifications of this invention as claimed, regardless of what the device is made of, should be considered as an embodiment of this invention.

One skilled in the art will recognize that the foregoing examples are not to be taken in a limiting sense and are simply illustrative of at least some of the aspects of the present invention.

While selected embodiments have been chosen to illustrate the invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment, it is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

I claim:

1. A shovel comprising:
a blade, the blade having a blade edge, a right edge extending from the blade edge and further comprising a right coupling aperture, and a left edge extending from the blade edge and further comprising a left coupling aperture;
a right handle, the right handle comprising a right handle curved end enabling rotatable coupling with the right coupling aperture of the blade right edge, and further comprising a right handle aperture distal from the right handle curved end; and
a left handle, the left handle comprising a left handle curved end enabling rotatable coupling with the left coupling aperture of the blade left edge and comprising a left handle aperture, whereby the right handle aperture and the left handle aperture are adapted to be simultaneously grasped by a same human hand when the right handle and the left handle are rotated toward a center axis of the blade, and whereby a position of the right handle curved end in the right coupling aperture and a position of the left handle curved end in the left coupling aperture when the right handle and the left handle are both rotated toward a center axis of the blade lock the shovel in an assembled position.

2. The shovel of claim 1, wherein the right handle and the left handle are adapted to be pressed together by a same human hand when the right handle and the left handle are rotated toward a center axis of the blade.

3. The shovel of claim 1, wherein the right handle and the left handle are adapted to be pressed together by a same human hand when the right handle and the left handle are rotated toward a center axis of the blade and the right handle is at an end of its extension range.

4. The shovel of claim 1, wherein the right handle and the left handle are adapted to be pressed together by a same human hand when the right handle and the left handle are rotated toward a center axis of the blade and the left handle is at an end of its extension range.

5. The shovel of claim 1, wherein the right handle is positionable substantively parallel with the blade along a blade transverse axis.

6. The shovel of claim 1, wherein the left handle is positionable substantively parallel with the blade along a blade transverse axis.

7. The shovel of claim 6, wherein the right handle is positionable substantively parallel with the blade along a blade transverse axis.

8. The shovel of claim 1, further comprising a second blade edge, the second blade edge extending from the blade right edge to the blade left edge, whereby the shovel has two digging edges.

9. The shovel of claim 1, wherein the right handle comprises a right handle sheet, wherein the right handle is rotatably coupled with the blade right edge.

10. The shovel of claim 1, wherein the left handle comprises a left handle sheet, wherein the left handle is rotatably coupled with the blade left edge.

11. The shovel of claim 10, wherein the right handle and the left handle are adapted to be pressed together by a same human hand when the right handle and the left handle are rotated toward a center axis of the blade and the right handle is at end of its extension range.

12. The shovel of claim 10, the right handle and the left handle are adapted to be pressed together by a same human hand when the right handle and the left handle are rotated toward a center axis of the blade and the left handle is at end of its extension range.

13. The shovel of claim 10, wherein the left handle is positionable substantively parallel with the blade along a blade transverse axis.

14. The shovel of claim 10, wherein the right handle comprises a right handle sheet, wherein the right handle is rotatably coupled with the blade right edge.

15. The shovel of claim 14, wherein the right handle and the left handle are adapted to be pressed together by a same human hand when the right handle and the left handle are rotated toward a center axis of the blade and the right handle is at end of its extension range.

16. The shovel of claim 14, wherein the right handle and the left handle are adapted to be pressed together by a same human hand when the right handle and the left handle are rotated toward a center axis of the blade and the left handle is at end of its extension range.

17. The shovel of claim 14, wherein the right handle is positionable substantively parallel with the blade along a blade transverse axis.

18. The shovel of claim 1, the blade further comprising a blade handle aperture positioned distally to the blade edge, the back handle aperture adapted to receive a user's hand extending through the blade to enable a user of the shovel to apply manual force in shoveling.

* * * * *